(12) United States Patent
Angus et al.

(10) Patent No.: US 12,479,649 B2
(45) Date of Patent: Nov. 25, 2025

(54) COOLING SLEEVE AND MATING BOTTLE

(71) Applicant: Amphipod, Inc., Seattle, WA (US)

(72) Inventors: June Angus, Seattle, WA (US); Keith Willows, Seattle, WA (US); Antonio Del Rosario, Bellevue, WA (US)

(73) Assignee: Amphipod, Inc., Seattle, WA (US)

( * ) Notice: Subject to any disclaimer, the term of this patent is extended or adjusted under 35 U.S.C. 154(b) by 100 days.

(21) Appl. No.: 18/420,459

(22) Filed: Jan. 23, 2024

(65) Prior Publication Data

US 2024/0246745 A1 Jul. 25, 2024

Related U.S. Application Data

(60) Provisional application No. 63/576,219, filed on Jan. 25, 2023.

(51) Int. Cl.
*B65D 81/38* (2006.01)
(52) U.S. Cl.
CPC .............. *B65D 81/3883* (2013.01)
(58) Field of Classification Search
CPC ............ B65D 81/3883; F25D 3/08; F25D 2303/0846; F25D 2331/803; F25D 2303/082; A45F 5/10; A45F 2005/1006; A45F 3/16

See application file for complete search history.

(56) References Cited

U.S. PATENT DOCUMENTS

| | | | | |
|---|---|---|---|---|
| 4,831,842 A | * | 5/1989 | Kelley | F25D 3/08 62/530 |
| 5,904,267 A | * | 5/1999 | Thompson | B65D 81/3879 220/23.91 |
| 6,128,915 A | * | 10/2000 | Wagner | B65D 81/3883 62/530 |
| 6,786,880 B2 | * | 9/2004 | Wall | A61F 13/84 607/108 |
| 9,907,421 B2 | * | 3/2018 | Carson | A47G 23/02 |

* cited by examiner

*Primary Examiner* — Frantz F Jules
*Assistant Examiner* — Martha Tadesse
(74) *Attorney, Agent, or Firm* — Lowe Graham Jones, PLLC

(57) ABSTRACT

An insulator for use with a bottle includes a sleeve defined by a sleeve panel forming a sidewall extending upwardly from a bottom end to a top end, the top end having an opening, wherein the bottle is retainable within an interior space defined by the sleeve panel. A first heat absorbing pad is positioned on the sidewall of the sleeve and a second heat absorbing pad positioned on the sidewall of the sleeve, the second heat absorbing pad being positioned at a location diametrically opposite the position of the first heat absorbing pad, the first heat absorbing pad further being formed with a central void.

25 Claims, 25 Drawing Sheets

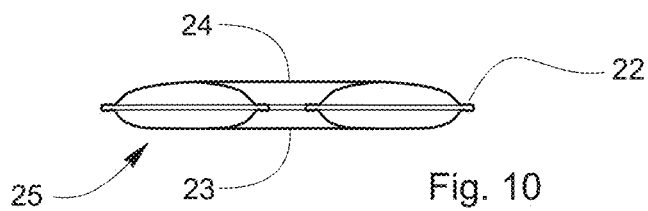
Fig. 10
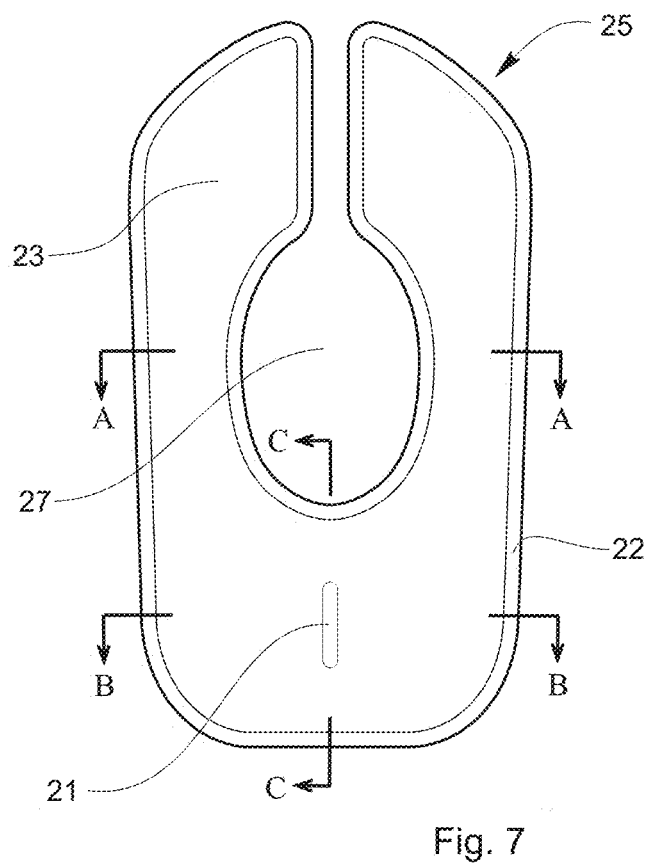 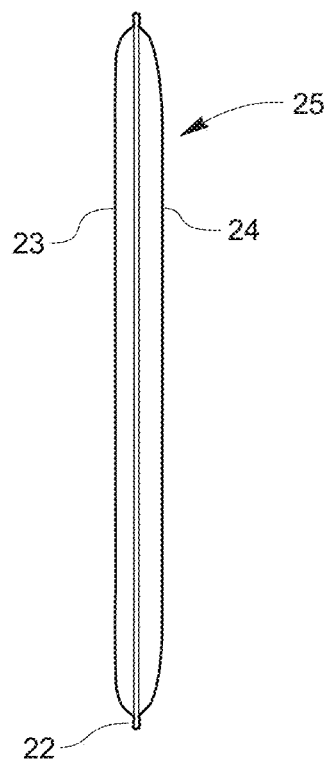
Fig. 7
Fig. 9
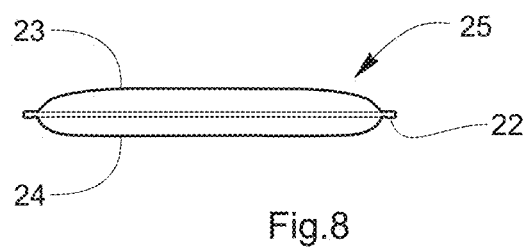
Fig. 8

COOLING SLEEVE AND MATING BOTTLE

PRIORITY CLAIM

This application claims the benefit of provisional application 63/576,219, filed Jan. 25, 2023, the contents of which are incorporated by reference.

FIELD OF THE INVENTION

The present invention relates to a cooling sleeve and mating bottle to provide active cooling to the bottle and to the hand of a user while the user is carrying the sleeve and bottle.

SUMMARY OF THE INVENTION

The preferred bottle with integrated cooling sleeve allows ready access to cool fluids while also cooling the user by providing local cooling of the user's palm and wrist area. The palm and wrists generally have good circulation thus provide a good means for imparting a desired cooling effect while engaging in sports like running, biking, or other vigorous activities. Most preferably, a user can place or store the sleeve and bottle in a freezer or refrigerator before use. When stored in the freezer, material such as gel contained within the gel pads positioned in the sleeve changes state from a liquid form to a more solid form to allow it to absorb a much greater amount of energy in the form of heat to cool the user and retain the liquid in the bottle at a lower temperature.

Preferably, the gel pads are strategically shaped and located such that they mitigate heat transfer from the user's palm to the liquid in the bottle, allowing the liquid in the bottle to stay cooler longer. The pads are also preferably located to avoid low-circulation areas of the hand (for example fingers) and further strategically shaped such that they allow the user to more easily squeeze the bottle to access fluids in the bottle when a squeeze-type bottle and cap is used.

In some cases it may be desirable to heat the gel pads to a temperature higher than ambient temperatures in order to carry warm fluids or to warm the user's hands.

Most preferably, the sleeve can be constructed using inexpensive and easily obtained materials, assembled using conventional manufacturing equipment, and produced relatively easily, to create a lightweight, comfortable, and aesthetically pleasing bottle and sleeve to achieve one or more of the functions described above.

Most preferably, the invention includes both a sleeve and mating bottle, and thus in most cases in the description which follows the term "the invention" may refer to a combination of a sleeve and a bottle. Some versions of "the invention" may also refer to the sleeve separately from the bottle, and in some versions the sleeve may be more universally attachable to a standard cylindrical bottle. Thus, the term "the invention" may encompass the sleeve together with a bottle, or the sleeve by itself, separated from a bottle.

In a preferred version, an insulator for use with a bottle includes a sleeve defined by a sleeve panel forming a sidewall extending upwardly from a bottom end to a top end, the top end having an opening, wherein the bottle is retainable within an interior space defined by the sleeve panel. A first heat absorbing pad is positioned on the sidewall of the sleeve and a second heat absorbing pad positioned on the sidewall of the sleeve, the second heat absorbing pad being positioned at a location diametrically opposite the position of the first heat absorbing pad, the first heat absorbing pad further being formed with a central void.

In some versions, the sleeve panel further includes an interior side facing toward the interior space and an exterior side facing away from the interior space, the first heat absorbing pad and the second heat absorbing pad each being positioned on the interior side of the sleeve panel.

Preferably, a retainer panel is attached to the sleeve panel, the first heat absorbing pad and the second heat absorbing pad each being positioned between the retainer panel and the sleeve panel.

In some versions, the retainer panel is relatively more heat-conductive than the sleeve panel.

In some cases, the first heat absorbing pad and the second heat absorbing pad are formed as a single combined heat absorbing pad, the single combined heat absorbing pad being configured with separate regions which define the first heat absorbing pad and the second heat absorbing pad.

Preferably, the second heat absorbing pad is configured with a narrow central neck, the narrow central neck being positioned centrally between the top end and the bottom end of the sleeve.

In some versions, a height is defined from the top end to the bottom end of the sleeve, with a midpoint defined half-way between the top end and the bottom end, and further wherein both the central void and the neck intersect with the midpoint.

In some versions, a height is defined from the top end to the bottom end of the sleeve, with a midpoint defined half-way between the top end and the bottom end, wherein the central void intersects with the midpoint.

In some versions, a hand strap attached to the sleeve, the hand strap being positioned on the exterior side of the sleeve panel and over the second heat absorbing pad.

Preferably, the bottle includes a length and a width along a plane perpendicular to a height of the bottle, the width of the bottle being greater than the length of the bottle, and further wherein, when the bottle is retained within the sleeve, the first heat absorbing pad extends substantially across the entire width of the bottle and the second heat absorbing pad extends substantially across the entire width of the bottle.

Preferably, a retainer panel is attached to the sleeve panel, the retainer panel being arranged to define a first pocket and a second pocket on the interior side of the sleeve, the first heat absorbing pad being removably retained within the first pocket and the second heat absorbing pad being removably retained within the second pocket.

In some versions, each of the first heat absorbing pad and the second heat absorbing pad are filed with a gel material.

In another preferred version, the insulator includes a sleeve defined by a sleeve panel forming a sidewall extending upwardly from a bottom end to a top end, the top end having an opening, wherein the bottle is retainable within an interior space defined by the sleeve panel. A hand strap is attached to the sleeve between the top end and the bottom end, with a heat absorbing pad positioned on the sidewall of the sleeve, the heat absorbing pad including a hand heat absorbing pad region located at a position underlying the hand strap. A void region is positioned on the sidewall of the sleeve, the void region being located diametrically opposite the hand heat absorbing pad region, wherein the heat absorbing pad is not positioned over the void region when the heat absorbing pad is positioned on the sidewall of the sleeve.

In some versions, the heat absorbing pad further includes a finger heat absorbing pad region, the finger heat absorbing pad region substantially encircling the void region.

In some versions, the heat absorbing pad includes a first heat absorbing pad and a second heat absorbing pad, the first heat absorbing pad encompassing the finger heat absorbing pad region and the void region, the second heat absorbing pad encompassing the hand heat absorbing pad region.

In some examples, the sleeve panel further includes an interior side facing toward the interior space and an exterior side facing away from the interior space, the heat absorbing pad being positioned on the interior side of the sleeve panel.

In some examples, a retainer panel is attached to the sleeve panel, the heat absorbing pad being positioned between the retainer panel and the sleeve panel.

In some examples, the retainer panel is relatively more heat-conductive than the sleeve panel.

In some examples, the heat retaining pad is integrally formed with the sleeve panel.

In some versions, the hand heat absorbing pad region is configured with a narrow central neck, the narrow central neck being positioned centrally between the top end and the bottom end of the sleeve.

Preferably, the void region is positioned centrally between the top end and the bottom end of the sleeve.

Preferably, a height extends from the top end to the bottom end of the sleeve, with a midpoint defined half-way between the top end and the bottom end, and further wherein both the void region and the central neck intersect with the midpoint.

Preferably, the bottle includes a length and a width along a plane perpendicular to a height of the bottle, the width of the bottle being greater than the length of the bottle, and further wherein, when the bottle is retained within the sleeve, hand heat absorbing pad region extends substantially across the entire width of the bottle and the finger heat absorbing pad region extends substantially across the entire width of the bottle.

In some examples, a retainer panel is attached to the sleeve panel, the retainer panel being arranged to define a pocket on the interior side of the sleeve, the heat absorbing pad being removably retained within the pocket.

Preferably, each of the first heat absorbing pad and the second heat absorbing pad are filed with a gel material.

BRIEF DESCRIPTION OF THE DRAWINGS

Preferred and alternative examples of the present invention are described in detail below with reference to the following drawings.

FIG. 7 is a front view of a preferred encapsulated gel pad 25, the back view being a mirror image.

FIG. 8 is a bottom view of the encapsulated gel pad of FIG. 7.

FIG. 9 is a right side view of the encapsulated gel pad of FIG. 7, the left side being a mirror image.

FIG. 10 is a top view of the encapsulated gel pad of FIG. 7.

DETAILED DESCRIPTION OF THE PREFERRED EMBODIMENT

Figure 1:
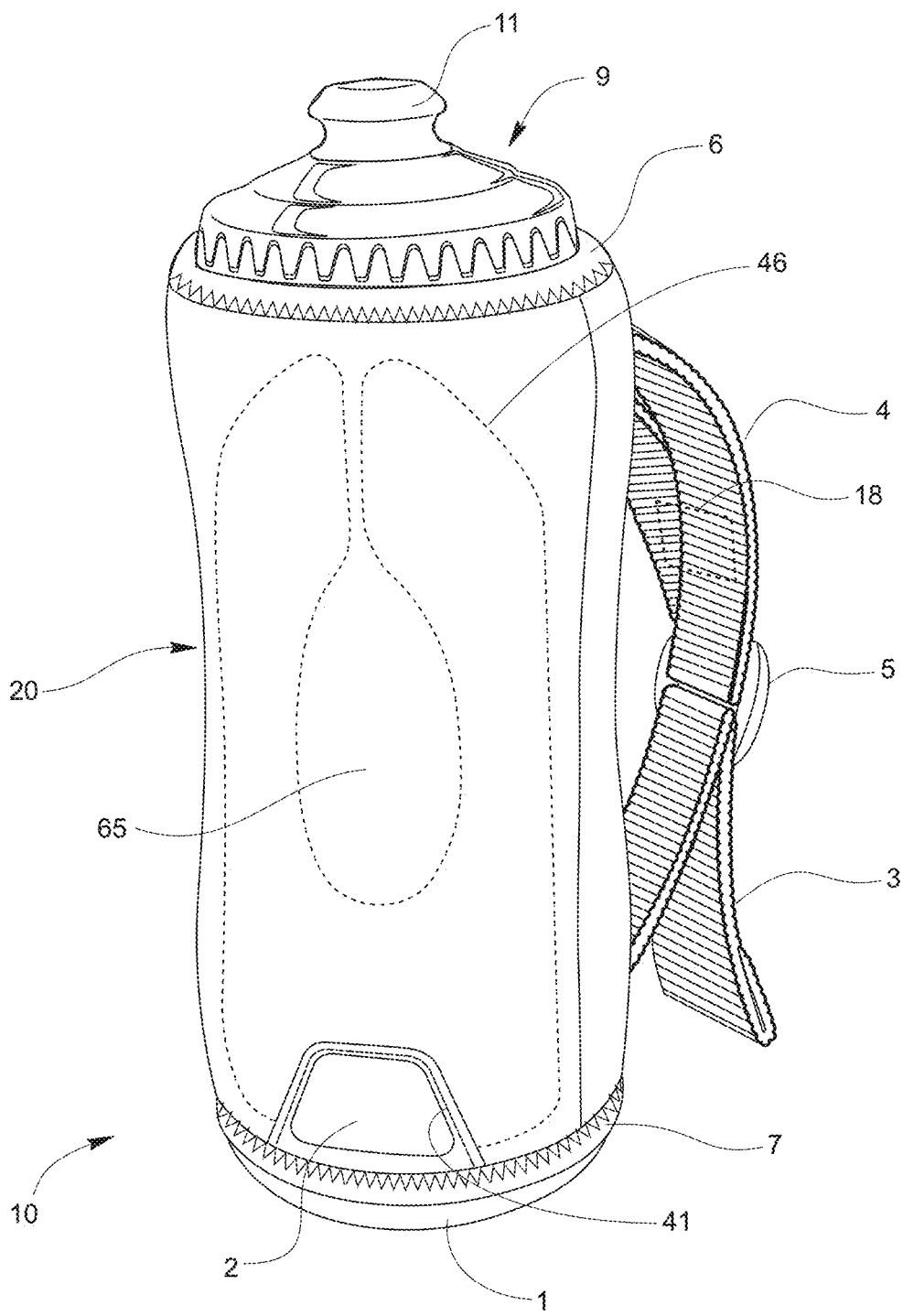
FIG. 1 is a front three-quarter perspective view of a preferred embodiment of a sleeve and mating bottle 10, having a sleeve 20, cap 9, bottle 1, and finger/squeeze area 65.

The preferred sleeve as illustrated and described in its various embodiments is preferably manufactured from a swatch of SBR (styrene-butadiene), neoprene (chloroprene or CR) or other sheet material of appropriate thickness (as commonly used in wetsuits), and is preferably die-cut. The sheet material may be laminated on one or both faces with a facing sheet material, preferably fabric such as tricot nylon, spandex, or Lycra, and most preferably using a stretch fabric. The thickness for the SBR or neoprene sheet material can range from 1 mm or less to 4 mm or more depending on the desired insulation, cooling, cushioning or other mechanical function.

The sleeve insulation material can be formulated such that when frozen it acts to further cool the bottle. For example, micro-encapsulated phase change material (like encapsulated wax beads) can be used added or formulated with the SBR/neoprene such that the sleeve material further acts similar to the encapsulated gel pads whereby when the sleeve is frozen more energy is required to change the temperature of the sleeve/bottle assembly.

In some versions, the sleeve can be manufactured from a single sheet of fabric or other material, without further lamination or facing layers, preferably having some stretch or give. In some versions, the sleeve can also be manufactured from somewhat flexible plastic sheet material that is printed, stickered/decaled, silk-screened, coated, painted, or otherwise clad with a thin layer of material that preferably adds visual appeal but also could add strength, durability, reflectivity or other useful functions. Further, the sleeve could be molded as one piece, with through-holes molded in place.

It should also be noted that although the sleeve is preferably cutout from sheet materials by a die-cutting process, it could also be created by utilizing a number of different manufacturing processes including injection molding, pressure forming, casting or others. A thin layer of material may optionally be added or laminated by any of a variety of techniques such as in-mold transfer, gluing, heat lamination, silk screening, dipping, etc., to create a surface texture, surface reflectivity, or added strength.

A preferred version of the invention uses gel pads which are attached to, or encapsulated within, the base panel or sheet. The gel pads are preferably constructed similar to a gel or ice pack. Preferably two sheets (or in some cases more, or in some cases a single sheet, folded in half) of flat stock soft/flexible TPU are placed together with one sheet on top of the other, and joined at a periphery such as by using ultrasonic/heat welding or other joining techniques (leaving an injection area potentially un-welded) and die cut into the desired shape. Gel or other suitable material is injected into the gel pad and the injection area is heat or ultrasonically sealed to encapsulate the gel in place in the pad. Although encapsulation sheets are preferably made of soft and flexible TPU (thermoplastic polyurethane), other materials can be used such as PP (polypropylene), PE (polyethylene), vinyl or other materials. Also certain formulations of self-skinning gels, molded or otherwise formed gel-like materials can be used. The liquid (or gel) encapsulated by the encapsulation sheets is preferably made of a gel or gel-like mixture commonly used in reusable ice packs. Water, salt water, or other mixtures or solutions of polymers of cellulose or other materials can be used such that a significant amount of heat energy can be absorbed and thus helps keep fluids carried in the bottle cool while also drawing heat away from a user's palm.

In some versions, two or more different types of material could be used for the encapsulation sheets, particularly where it may be desirable to place one type of material with desirable properties (such as greater heat transferability) on the side closest to the bottle and the other side with different properties (such as lesser heat transferability) placed closest to the user's palm. Further, it may be desirable to use material that is thermally reflective (or conductive or insulating or more or less flexible) on one side and material that is less so on the other, taking advantage of certain reflective and conductive properties of the material.

The bottle is preferably formed (blow molded or the like) from low density polyethylene (although many other materials such as HDPE, PP, Tritan, PETE, or others of appropriate flexibility could be used, as is desirable to allow the bottle to be squeezed). Although it is generally more desirable for the bottle to be flexible, in some case a more rigid material could be used (by being formed from materials such as HDPE, PP, Tritan, PETE, or stainless steel). A preferred cap of the bottle can be injection molded in polypropylene (PP), or alternatively formed from HDPE, LDPE or other materials. The cap spout is preferably primarily made of thermoplastic elastomer (TPU) and in some cases is assembled from LDPE, HDPE, PP, silicone and/or a mixture of other materials.

Figure 21:
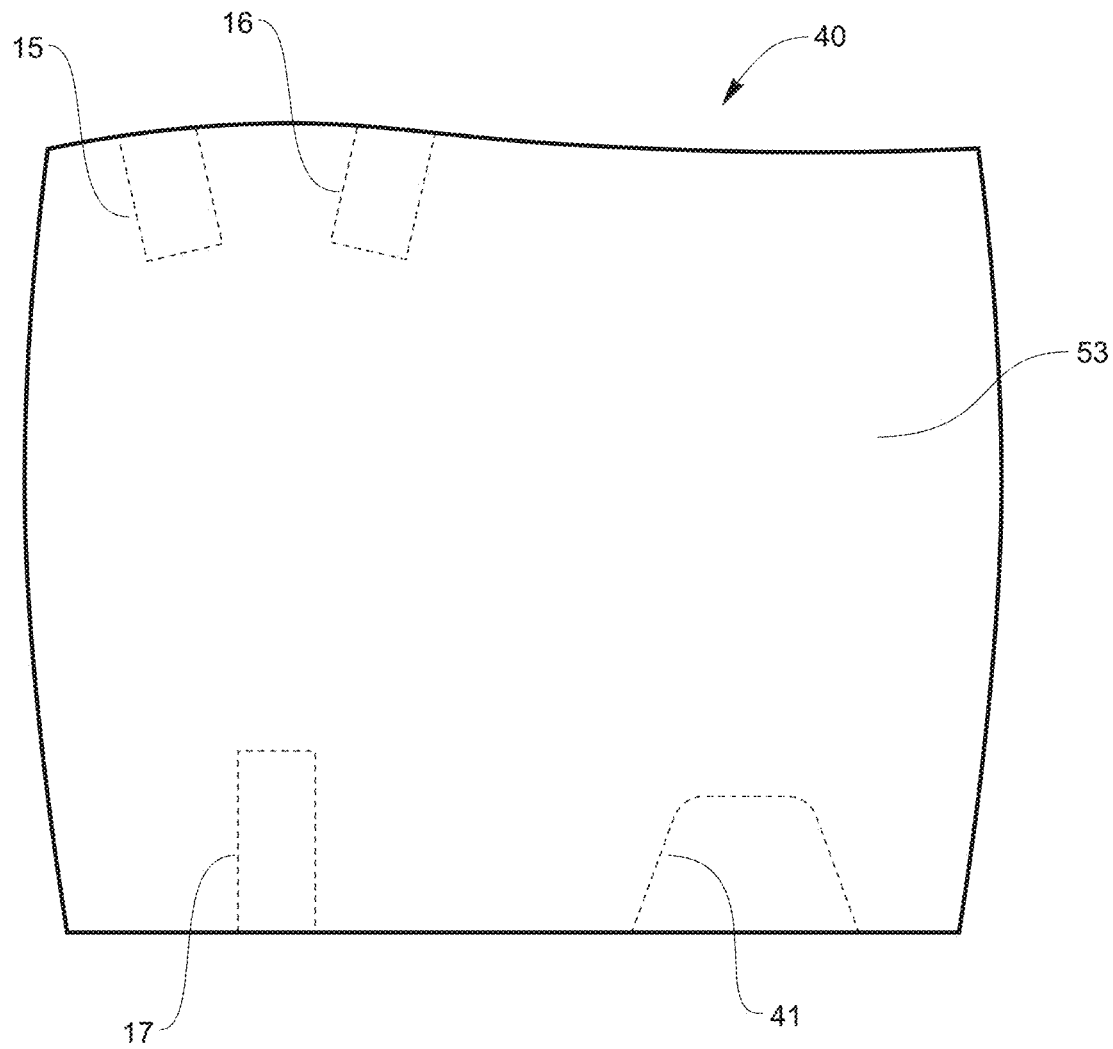
FIG. 21 is an inside back view of a sleeve panel 40, showing stitching 41, 15, 16 and 17.

FIG. 1 is a front perspective view of a preferred embodiment of a bottle together with a sleeve. The combined bottle and sleeve 10 includes a sleeve 20, a squeeze-type bottle 1 and push-pull cap 9 having a spout 11. The sleeve 20 is preferably formed by die-cutting neoprene/SBR or other material in a shape as shown in FIG. 21. As best seen in the sectional view of FIG. 25, the sleeve preferably includes a base panel 38 (of neoprene/SBR) with laminated front and back layers of face fabric 52 and 53 (preferably tricot, stretch Lycra, spandex or the like), preferably laminated to both sides (for example, the top and the bottom side from the perspective of FIG. 25) of the base panel 38 to form a sleeve panel 40. The sleeve panel 40 is sized so that it can be arranged to snugly surround and hold the bottle 1 in place within the sleeve 20. Depending on the particular implementation, the sleeve panel 40 may comprise the base panel 38 alone.

Figure 3:
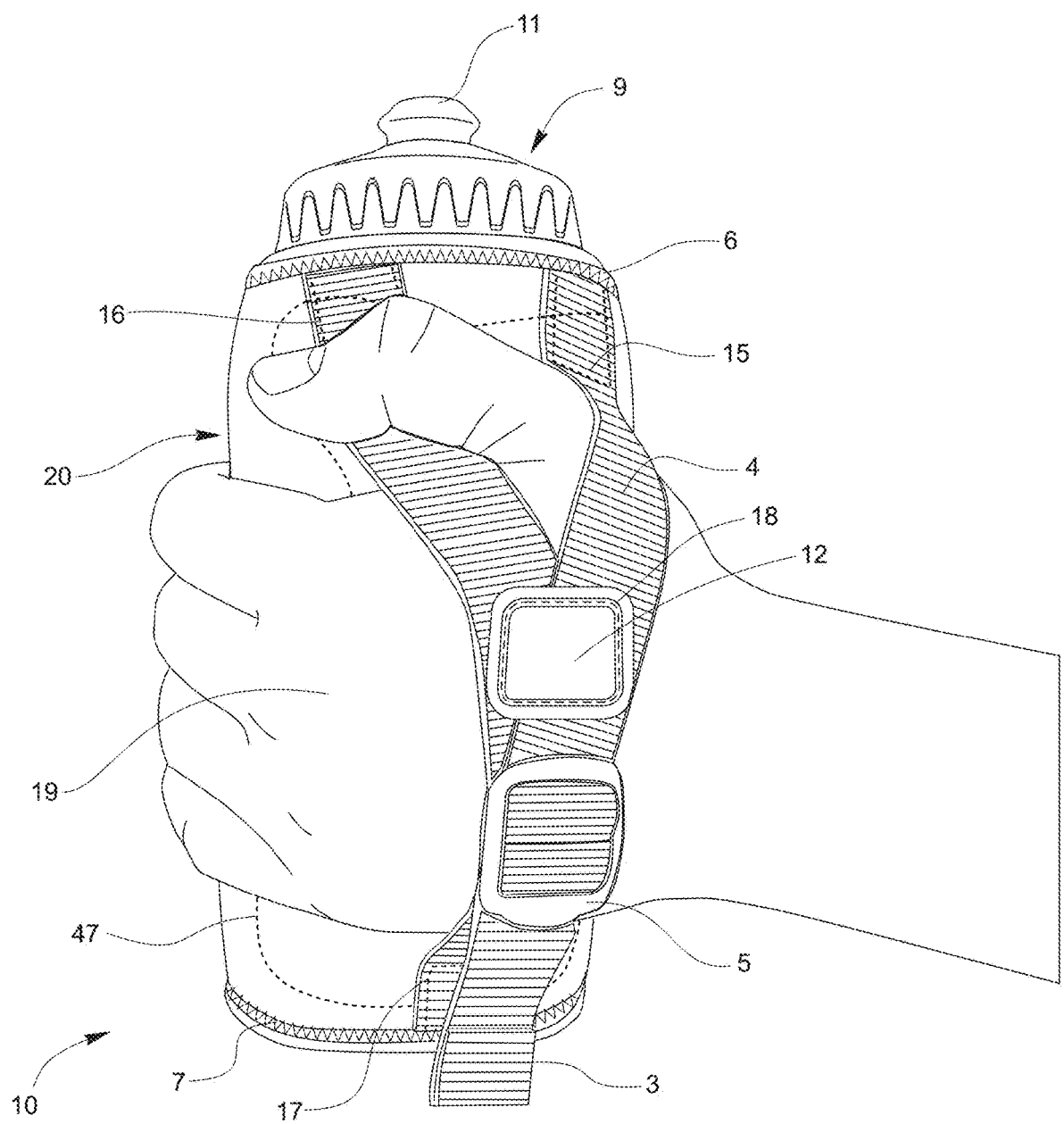
FIG. 3 is a back perspective view of the preferred embodiment of FIG. 1, wherein a hand 19 is shown grasping the bottle and sleeve.
Figure 4:
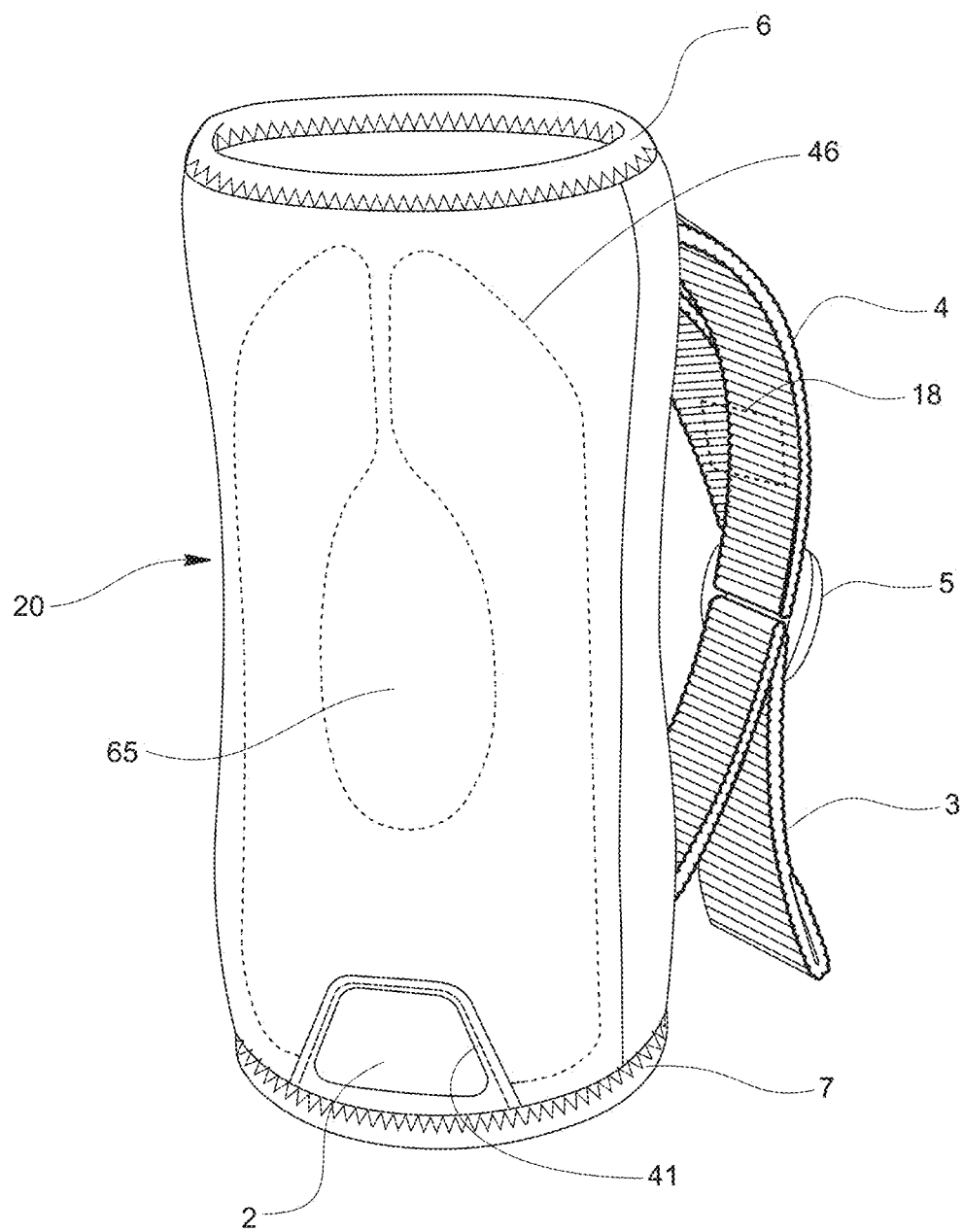
FIG. 4 is a front three-quarter perspective view of a preferred sleeve 20, in this case illustrated without a bottle.

In a preferred version the sleeve includes a hand strap allowing a user's hand to be inserted between the sleeve and the strap. In the illustrated example, an upper hand strap 4 and lower hand strap 3 are preferably cut from lengths of nylon or other webbing having a length sized to fit a hand as can be seen in FIG. 3. The upper hand strap 4, after being cut to a desired length from about 8 to 12 inches (depending on desired sizing) is then threaded through slot 55 in an adjuster 5 (see FIGS. 5 and 6) and further around rung 58 and back down through slot 56 whereby the upper hand strap 4 is slid through adjuster 5 such that the upper hand strap 4 is folded substantially in half by rung 58.

Figure 2:
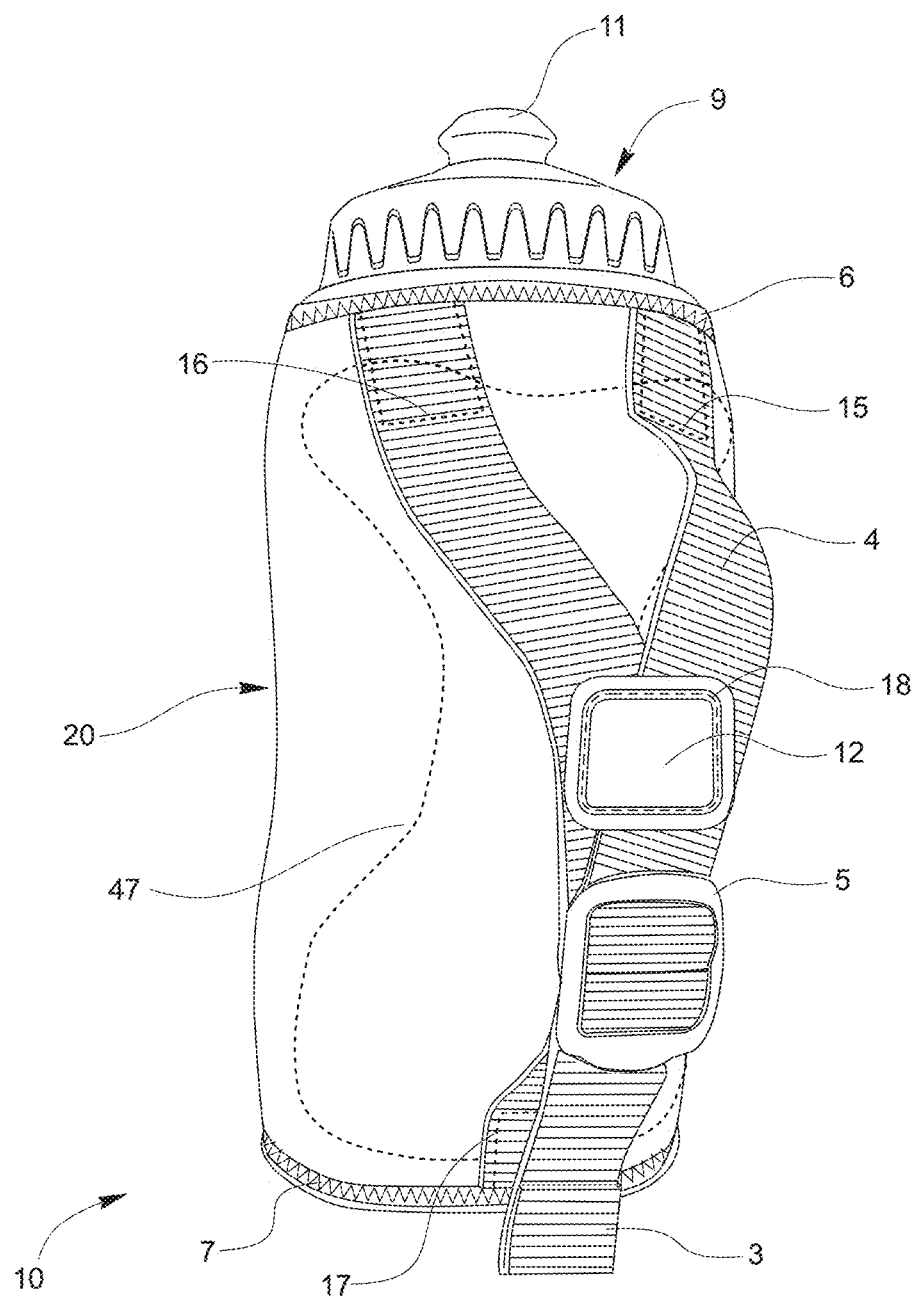
FIG. 2 is a back perspective view of the preferred embodiment of FIG. 1.

The upper hand strap 4 is then splayed apart at its ends by about 1 inch and a logo patch 12 is sewn through the splayed upper hand strap 4 via stitch 18 adjacent adjuster 5, as seen in FIG. 2. Opposing ends of the upper hand strap 4 are sewn to the back side of the sleeve panel 40 (shown in FIG. 21), which in the illustrated version includes stitching through outer facing 52, neoprene/SBR base panel 38 and inner facing 53 of the sleeve panel 40. Again with reference to FIG. 2, one end of the upper hand strap 4 is sewn to the panel forming the sleeve 20 by stitch 15 and the other end is sewn to the panel by stitch 16.

The lower hand strap 3, after being cut to a desired length from about 4 to 8 (depending on desired sizing) inches, is then threaded up through slot 55 in adjuster 5 and further folded around rung 57 and back down through slot 54 whereby the lower strap 3 is slid through the adjuster 5 such that the lower hand strap 3 is folded somewhat in half by rung 57. The lower end of the lower hand strap 3 is then sewn to the sleeve panel 40 by stitch 17 through the lower end of the lower strap 3, facing 52, neoprene/SBR base sheet 38 and facing 53 of sleeve panel 40. The free end of the lower hand strap 3 is fed through the adjuster 5 and finished via folding over a small portion of the end and sewing or otherwise edged such that it does not easily slip back through adjuster 5.

A front side logo patch 2 is optionally sewn to the sleeve panel 40 via stitch 41 through logo patch 2, facing 52, neoprene/SBR base sheet 38 and facing 53 of the sleeve panel 40.

Figure 25:
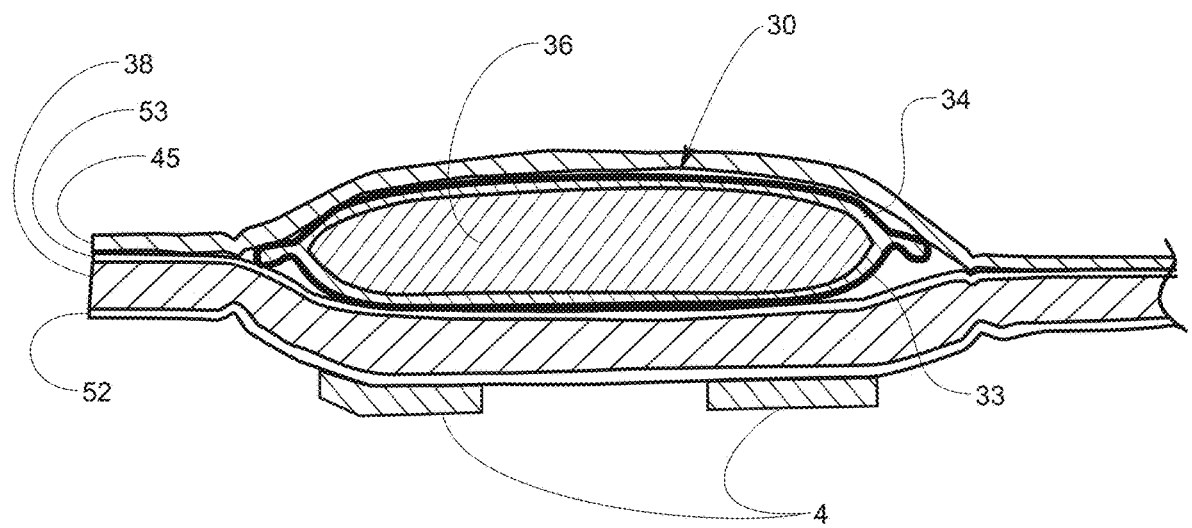
FIG. 25 is a sectional view taken through section D-D of FIG. 22. Thicknesses of various layers/materials are shown exaggerated and out of scale for ease of illustration and understanding, and the scale is increased for similar reasons.

Returning again to the sectional view of FIG. 25, the preferred sleeve base panel 38 (together with optional facing 52, 53 to form the sleeve panel) is shown with the upper hand strap positioned along a first side of the base panel, which in accordance with FIG. 2 is the outer side of the sleeve when it is constructed and in place surrounding a bottle. On the opposite side of the base panel (which is the interior of the sleeve when fully assembled) a gel pad is shown, including its encapsulating layers 33, 34 and the interior gel material 36.

Figure 22:
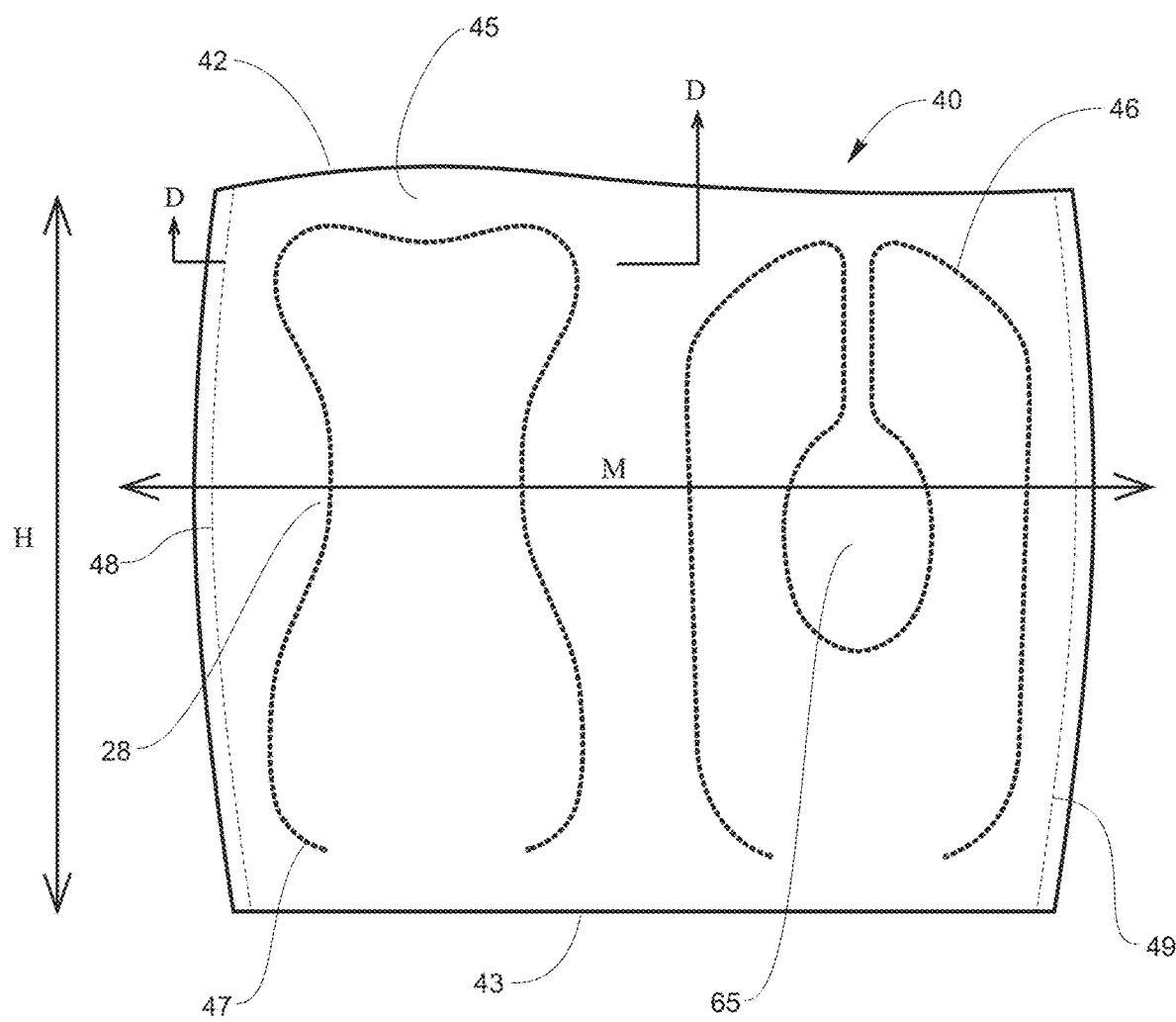
FIG. 22 is a back view of the sleeve panel 40 of FIG. 21, shown with an attached retainer panel 45.

As further seen in FIG. 22 with reference to the sectional view of FIG. 25, a retainer panel 45 is shown. The retainer panel 45 is preferably formed from light nylon stretch mesh and cut in the same shape as the sleeve panel 40 and its base sheet 38. The retainer panel is placed over the first face of the sleeve panel 40 (see FIG. 21), which again is on the interior of the sleeve when the sleeve is fully assembled. The retainer panel 45 covers the stitching 41, 15, 16 and 17 illustrated in FIG. 21. The retainer panel 45 is preferably cut from thin somewhat elasticized nylon mesh material such that encapsulated gel pads are retained between the retainer panel and the base panel, allowing the gel pads to be in close contact with the bottle 1 because of the nature of the material used for the retainer panel. As shown in the sectional view of FIG. 25, the base panel 38 is preferably thicker than the retainer panel 45. In some versions the base panel need not be thicker, but most preferably the base panel will be formed from a material or have dimensions or other properties that make the base panel relatively more insulative than the retainer panel, thereby allowing heat to more readily flow through the retainer panel than through the base panel. In one example, Lycra spandex or other thin light material can be used for retainer panel 45.

FIG. 22 shows the retainer panel 45 placed over the sleeve panel 40 of FIG. 21, with the retainer panel 45 sewn in place to the sleeve panel 40 via stitching 48, 49 and contoured stitching 46 and 47. The contoured stitch 46 is sized and configured to define a first pocket for a first gel pad 25 such that the first gel pad 25 is trapped in the first pocket between the sleeve panel 40 and the retainer panel 45, formed by the stitch 46. The second contoured stitch 47 is sized and configured to define a second pocket for a second gel pad 30 such that the second gel pad 30 is trapped in the second pocket formed by stitch 47, between the sleeve panel 40 and retainer panel 45. Edging 7 added to the bottom of the sleeve panel may further serve to retain the gel pads on the sleeve.

FIGS. 7-13 show a preferred embodiment of the first, or front, encapsulated gel pad 25. FIGS. 14-20 show a preferred embodiment of a second, or back, encapsulated gel pad 30. The front gel pad 25 is preferably formed of two sheets 23 and 24 of flat stock soft/flexible TPU, placing them together, one sheet on top of the other. These encapsulation sheets are then ultrasonically/heat or otherwise welded at a desired periphery 22, see FIG. 7 (leaving a small injection area potentially un-welded), and die cut into the desired shape about the periphery. Gel or other suitable material 26 is injected into the gel pad and the injection area is heat or ultrasonically sealed to fully encapsulate the gel in place in the pad. Bend crease welds may be desirable, such as crease 21, wherein a local area or areas of the opposing sheets 23, 24 are welded together to allow the gel pad to more easily bend to fit against the bottle 1.

FIG. 7 shows an optional gel pad void area 27, arranged to allow a user to more easily and directly apply pressure to the bottle 1 through the central void area such that bottle 1 can be easily squeezed to access fluids. With reference to FIG. 1, the corresponding squeeze void region 65 is preferably positioned on a front side of the sleeve. When used with a bottle having a shape such as the bottle shown in FIG. 27, the void area 27 on the first gel pad 25 allows a user to more easily apply directed pressure to finger/squeeze area 61 of the bottle 1, and thus the illustrated void 27 is preferably a central cutout area in gel pad 25, thereby forming the gel pad 25 as a horseshoe or donut shape. The void 27 could take a variety of forms; for example, the gel pad 25 could be sealed in this area so that the encapsulation sheets not necessarily cut out but are instead sealed to prevent gel from reaching this area. Further it should be noted that the void 27 strategically keeps cooling gel away from fingertips (in other words, restricting gel from being present in that region), as these extremities can be sensitive to cooler temperatures.

Most preferably, and with reference to FIG. 22, the squeeze void region 65, which is collocated with the void 27 of the first gel pad 25, is located in a central location along the sleeve, generally mid-way along the height H of the sleeve from top of the sleeve panel 42 (generally corresponding to the top binding 6 in FIG. 1) to the bottom of the sleeve panel 53 (generally corresponding to the bottom binding 7). In one version, the midpoint of the height of the sleeve is positioned within the void region 65. With reference to FIG. 22, axis M is positioned to indicate the midpoint between the top 42 and bottom 43 of the sleeve panel 40 (and thus the completed sleeve). The height midpoint M extends through the void region 65 (and thus the void 27 of the first gel pad 25 when the first gel pad is installed). The height midpoint M also extends through the neck 29 of the second gel pad 30 when the second gel pad is installed, and thus a corresponding neck 28 formed by the stitching 47. The squeeze void region 65 is also preferably positioned on the sleeve so that it is diametrically opposite from the location of the hand straps (when used) and diametrically opposite the center or neck of the second gel pad 30 when the sleeve is fully formed.

Similarly, the back or second gel pad 30 is formed of two sheets 33, 34 of soft/flexible TPU or other suitable material, in which one sheet is placed on top of the other and these sheets are welded at a periphery 32. As noted above, the second gel pad 30 is preferably formed in a shape similar to an hourglass wherein the central area necks in slightly in the middle to form a neck 29, corresponding to the neck 28 of the stitched pocket when installed, which is desirable for comfort and allows a user to more easily squeeze the bottle 1. Gel pad 30 is arranged with an upper end (near the top 42 of the sleeve panel 40 when installed, and which would be near the mouth of the bottle when in use) a lower end (near the bottom 43 of the sleeve panel 40 when installed, and which would be relatively near the base of the bottle when in use) and a middle between the upper and lower ends, wherein the upper end has a first width, the middle has a second width, and the lower end has a third width, wherein the first and third widths are wider than the second width. Gel pad 30, at the first and third widths, is sized to substantially span the bottle width (which, depending on the bottle, may be approximately the same as the bottle diameter) at each of the first and third widths.

Figure 23:
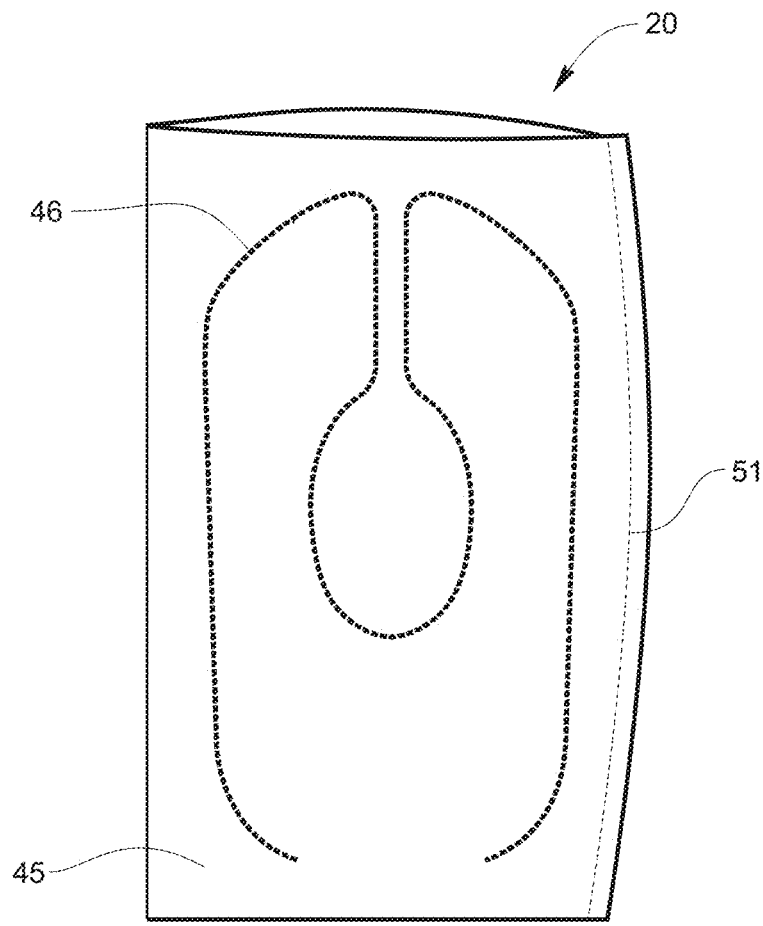
FIG. 23 shows a view of the sleeve panel of FIG. 22, folded in half and sewn along a seam 51 to produce the sleeve 20.
Figure 24:
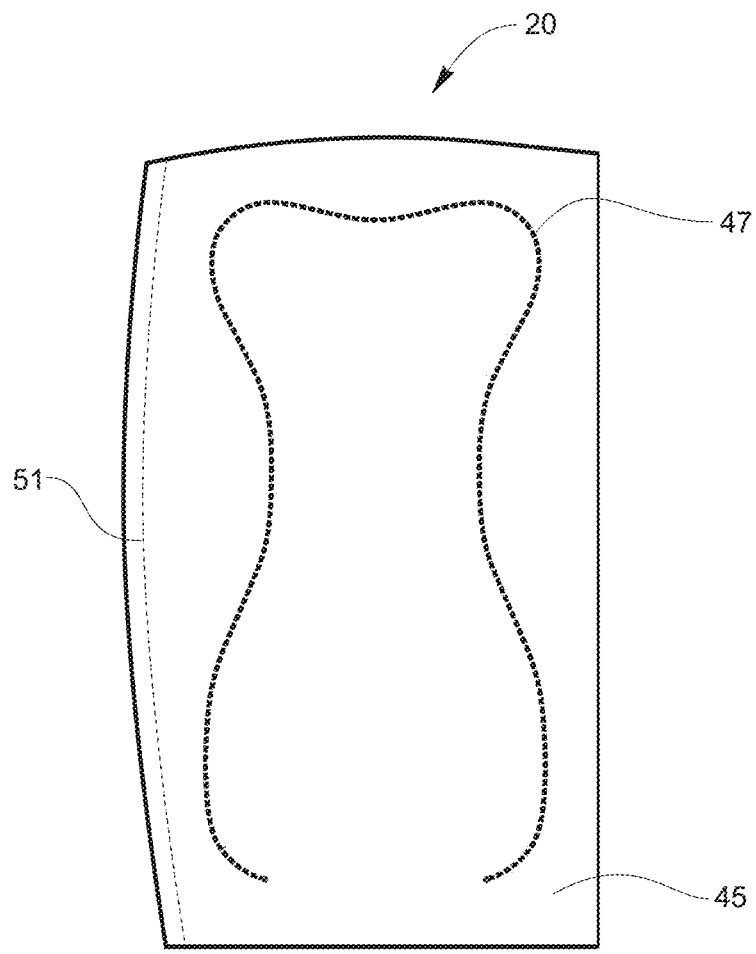
FIG. 24 shows an opposite side view of the sleeve of FIG. 23.

As described above, FIG. 22 shows the sleeve panel 40, wherein two pockets are created on the sleeve panel by the retainer panel 45 via stitching 46 and stitching 47 sized for the first gel pad 25 and the second gel pad 30 respectively. FIG. 23 shows the sleeve panel 40 folded in half and sewn to itself along stitch 51 to create a tube which forms the sleeve 20. The first gel pad 25 is then inserted into the pocket created by stitch 46 and the second gel pad 30 is inserted into the pocket created by stitch 47 (both into the space between panel 40 and stretch mesh 45.)

Figure 37:
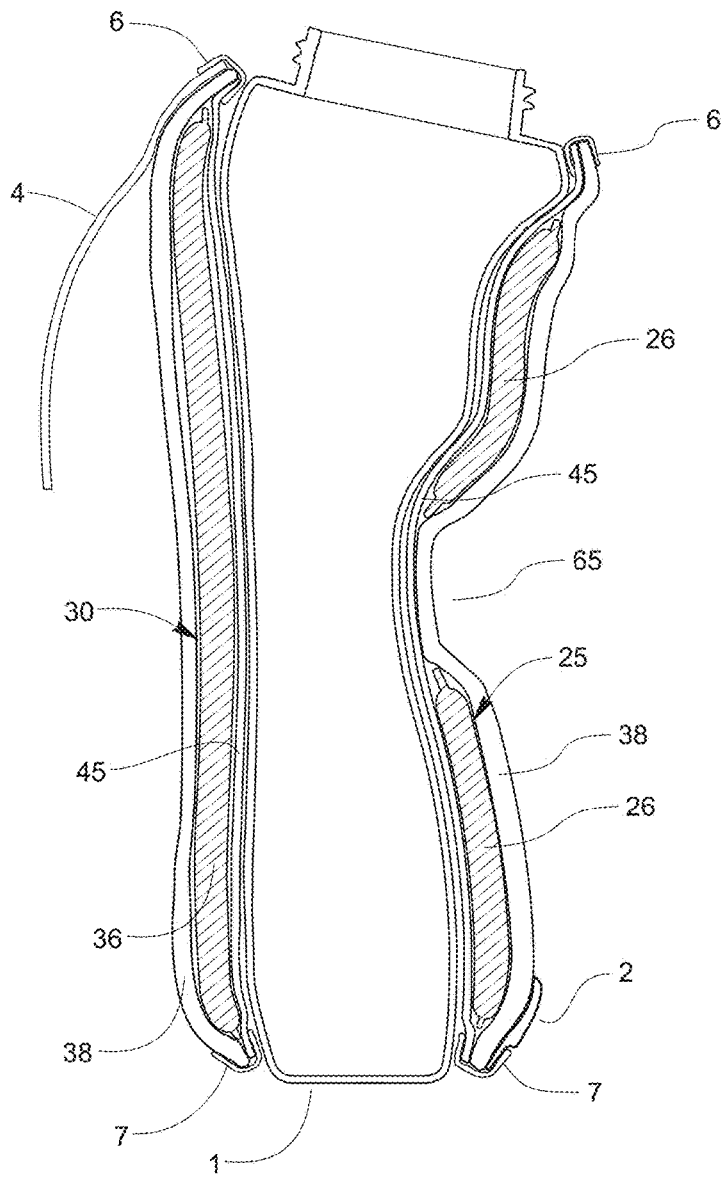
FIG. 37 is a sectional view through section U-U of FIG. 36, simplified for clarity and with some dimensions out of scale for ease of illustration and understanding.

The layering of materials is shown in cross-section in FIG. 25 and FIG. 37 (although in FIG. 37 the optional facing layers 52, 53 are not illustrated). After the gel pads are assembled as described above and the panel is sewn to itself along stitch 51, edge-binding 6 and 7 are sewn in place, with top edge binding 6 sewn along the top edge of the sleeve 20 and bottom edge binding 7 sewn along the bottom edge of the sleeve 20. Edge-binding 6 and 7 are preferably a somewhat stretchy Lycra, spandex, spandura or other similar elasticized material cut in a strip such that it provides a flexible and somewhat elastic edge binding function. It may be desirable for edge-binding 6 and 7 to have a reflective or retro-reflective surface such that binding material also serves to provide reflectivity for users exercising in low light conditions. Further, it may be desirable for straps 3 and/or 4 or other elements of sleeve 20 to have reflective and/or retro-reflective surface treatment.

Figure 5:
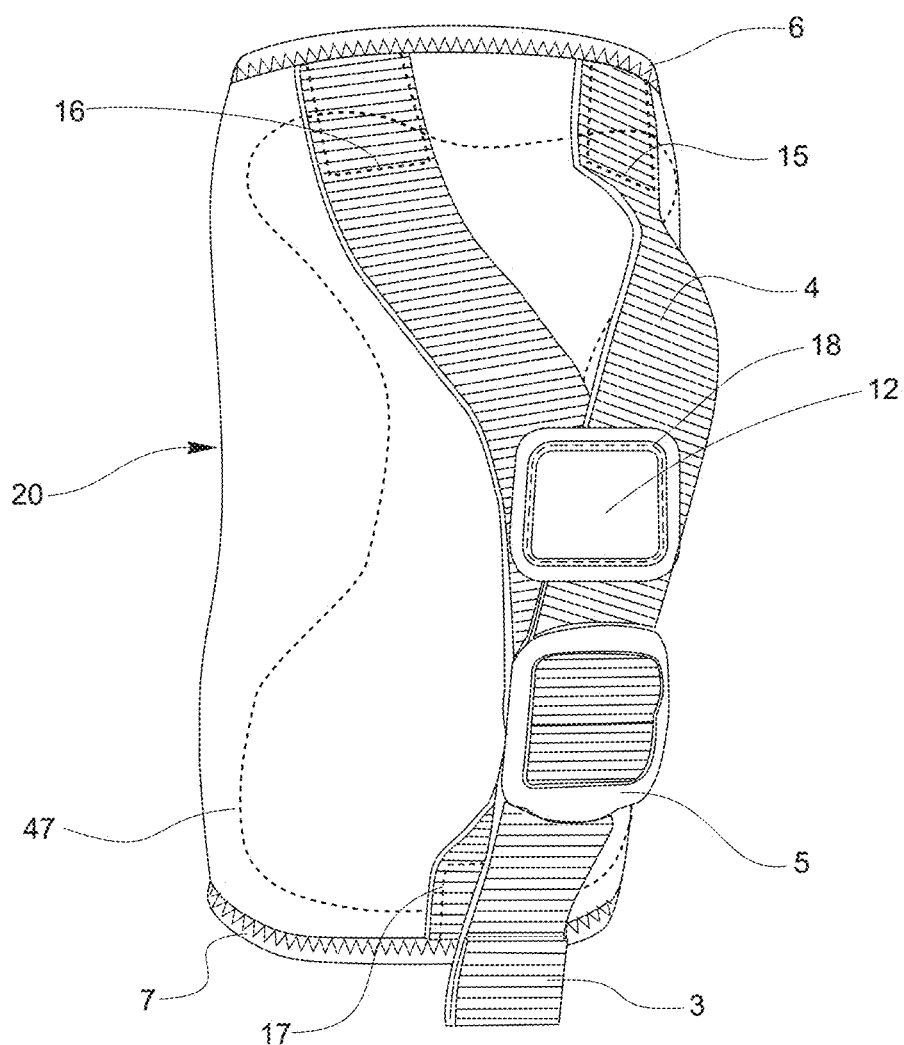
FIG. 5 is a back three-quarter perspective view of the sleeve of FIG. 4.
Figure 6:
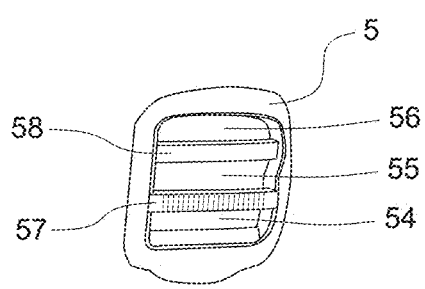
FIG. 6 shows an adjuster 5 separated from straps 3 and 4 which are illustrated in FIG. 5 but not shown in FIG. 6 for ease of illustration to show how the strap 3 is assembled through slots 55 and 54 around rung 57 and strap 4 is assembled through slots 55 and 56 around rung 58.
Figure 12:
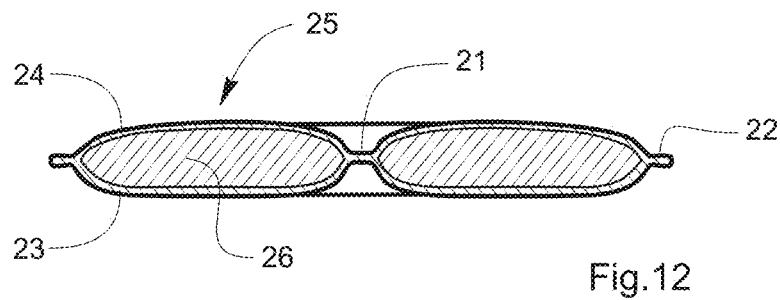
FIG. 12 is a section view through section B-B of FIG. 7.
Figure 13:
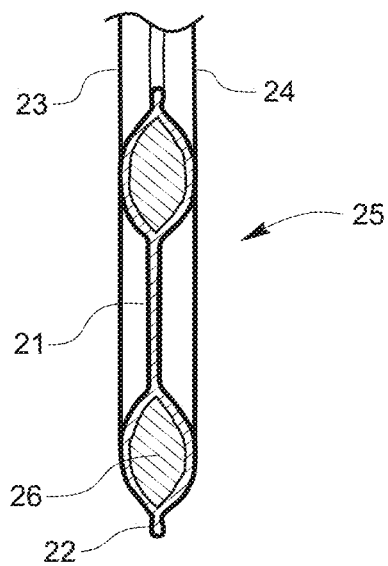
FIG. 13 is a section view through section C-C of FIG. 7.
Figure 11:
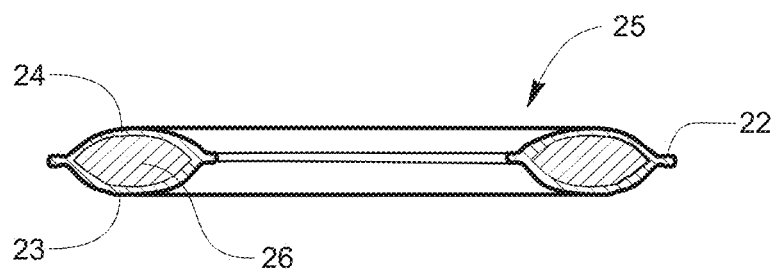
FIG. 11 is a sectional view taken through section A-A of FIG. 7. Thicknesses of encapsulation sheets 23 and 24 are shown exaggerated for clarity of illustration and understanding, and the section scale is increased for similar reasons.
Figure 17:
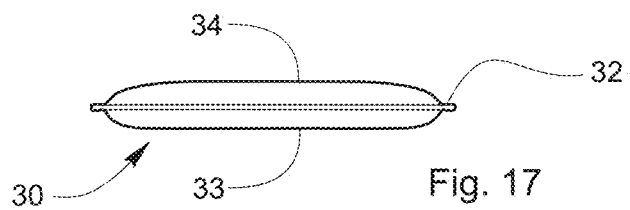
FIG. 17 is a top view of encapsulated gel pad of FIG. 14.
Figure 14:
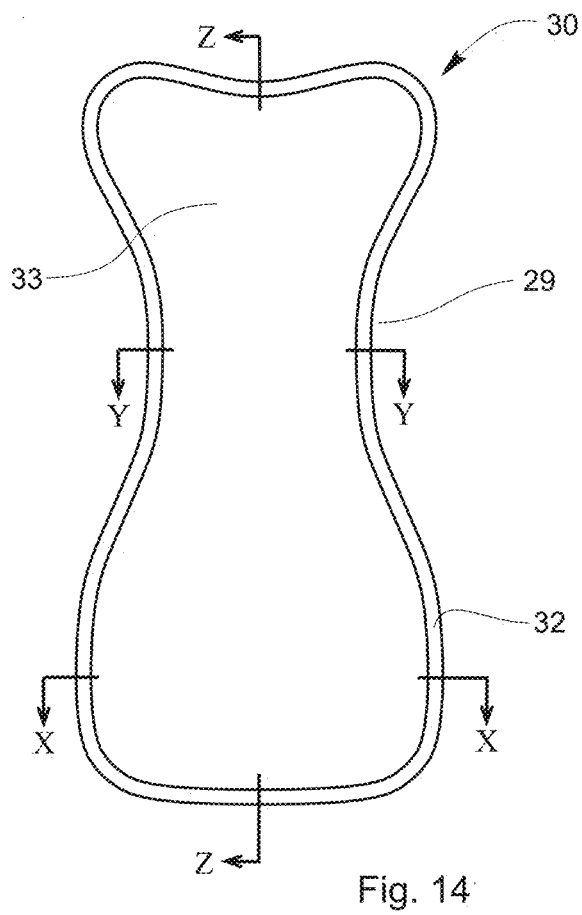
FIG. 14 is a front view of a preferred encapsulated gel pad 30, the back view being a mirror image.
Figure 16:
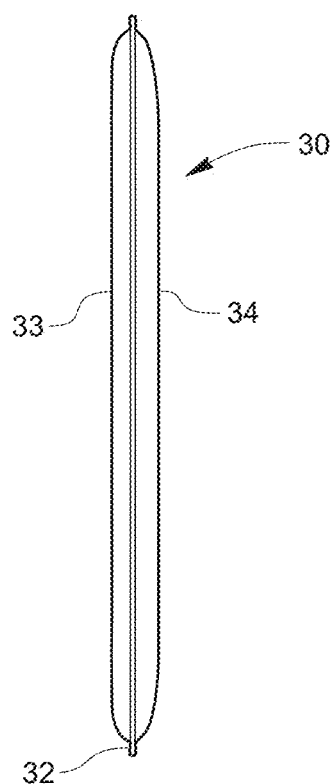
FIG. 16 is a right side view of encapsulated gel pad of FIG. 14, the left side being a mirror image.
Figure 15:
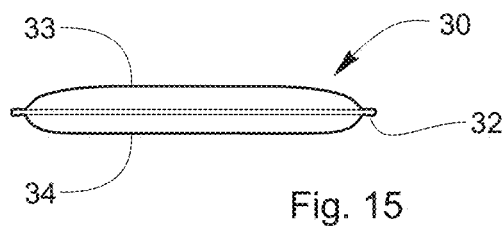
FIG. 15 is a bottom view of encapsulated gel pad of FIG. 14.
Figure 19:
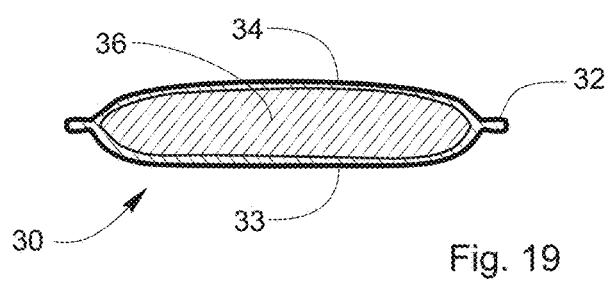
FIG. 19 is a section view through section Y-Y of FIG. 14.
Figure 18:
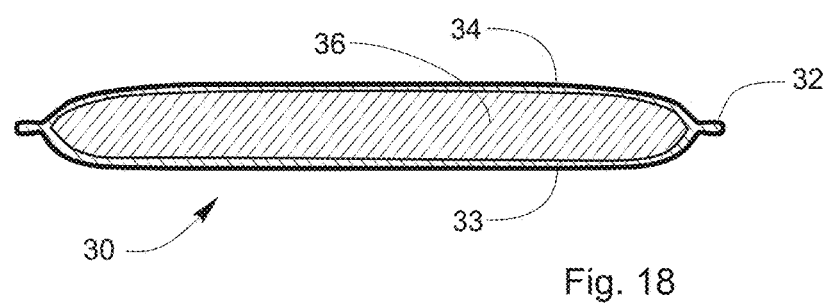
FIG. 18 is a section view through section X-X of FIG. 14. Thicknesses of encapsulation sheets 33 and 34 are shown exaggerated for clarity of illustration, and the section scale is increased for similar reasons.
Figure 20:
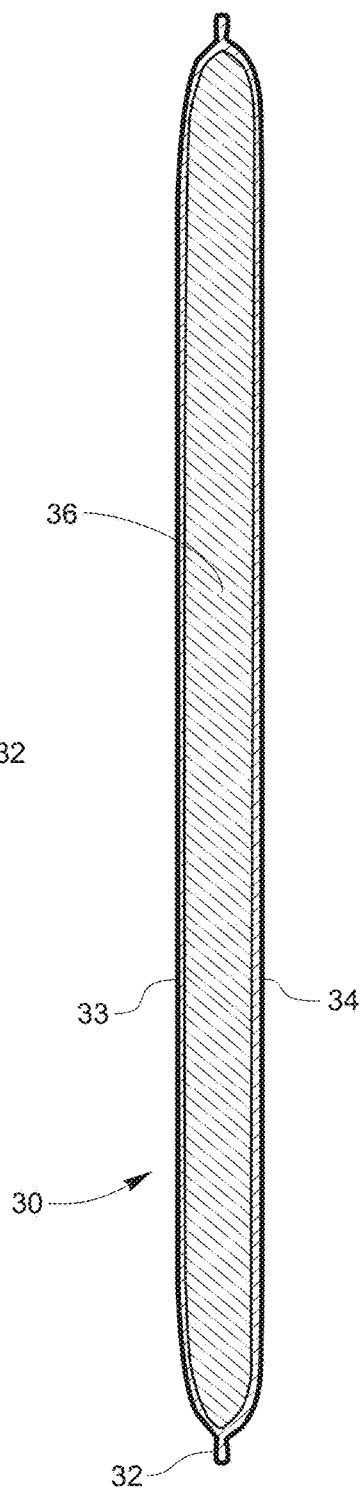
FIG. 20 is a section view through section Z-Z of FIG. 14.

Once edge binding 6 and 7 is sewn in place, the completed sleeve 20 is turned right-side-out as can be seen in FIG. 5, and at this point the sleeve is ready to receive a bottle 1, as shown in FIGS. 1, 2 and 3.

In some cases it may be desirable for the pockets created by stitch 46 and 47 to be user accessible to enable a user to remove the gel pads 25 and 30 to replace them and/or freeze them separately. In some versions, the retainer panel 45 and/or the sleeve panel 40 could have one or more slits or other cutouts such that gel pads 25 and 30 could be removed through the slits or cutouts either with or without removing the sleeve from bottle.

Figure 27:
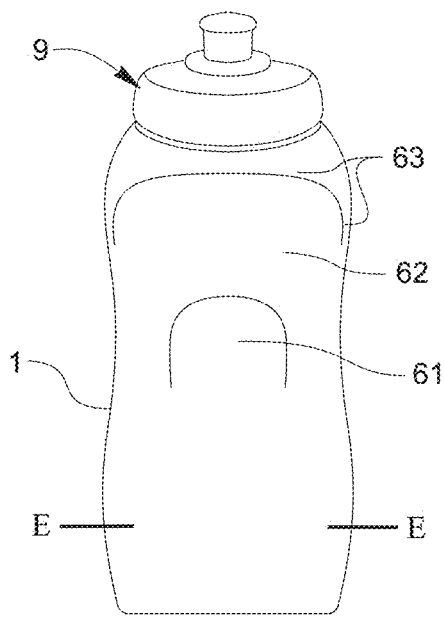
FIG. 27 is a front elevational view of a preferred bottle 1.
Figure 28:
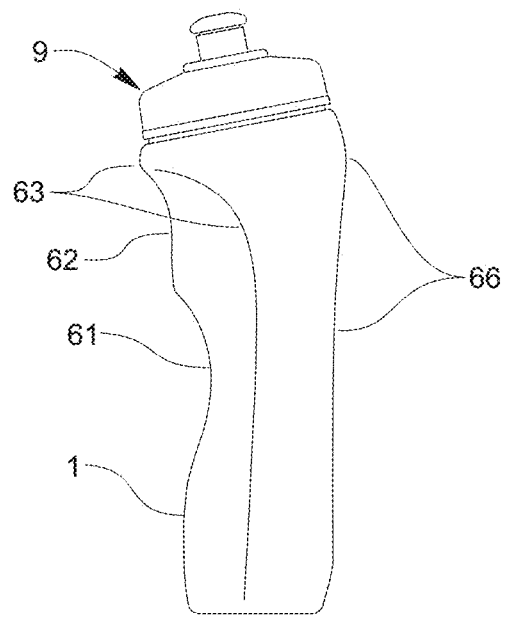
FIG. 28 is a right side elevational view of the bottle of FIG. 27, the left side being a mirror image.
Figure 29:
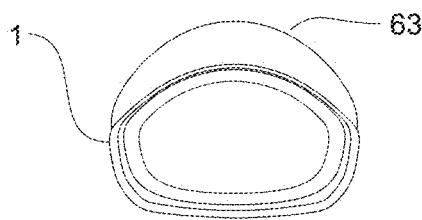
FIG. 29 is a bottom plan view of the bottle of FIG. 27.
Figure 36:
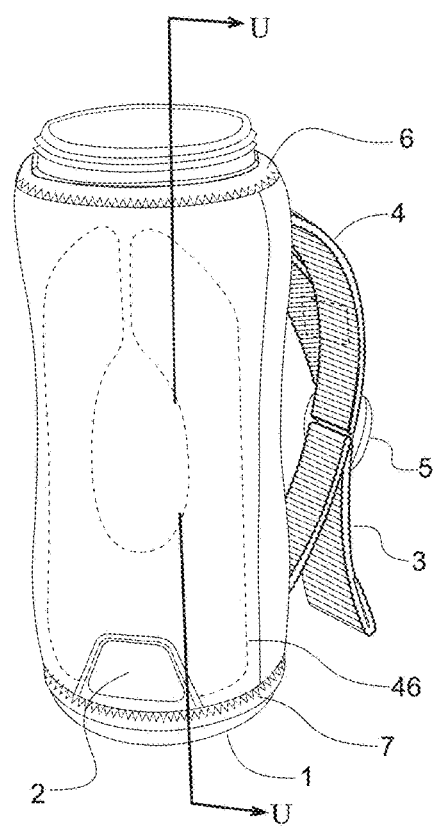
FIG. 36 is a front perspective view of an embodiment of a bottle with sleeve, with a cap removed and not shown.

FIG. 37 shows cross sectional view taken along plane U-U of FIG. 36, allowing the preferred finger/squeeze area 65 to be seen, and, further showing the gel pads 25 and 30 as they are held in place against the bottle 1 to both cool a user's palm gently through the base layer 38 and cool the fluids held in bottle 1. A preferred bottle is shown in FIG. 27 in which the bottle 1 includes a central finger area recess 61, upper recess 62 above the central finger recess, and lip 63. When used with the bottle of FIG. 27, the first gel pad 25 is preferably arranged to nest into and overly the recess 62 on the front side of bottle 1, with the first gel pad void region overlyin ghte finger area recess 61, and the second gel pad 30 nests into recesses 64 on the back side of bottle 1, when the sleeve 20 is held firmly to bottle 1.

Figure 26:
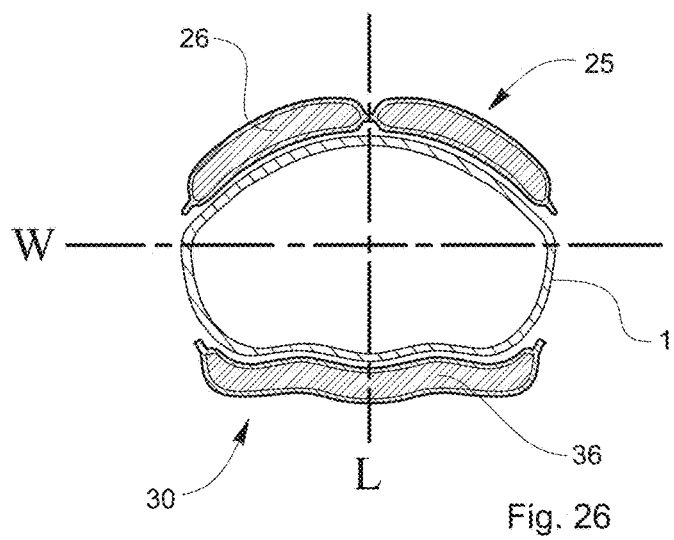
FIG. 26 is a sectional view through section E-E of FIG. 27 but adding gel pads 25 and 30 positioned about the bottle where they would be located when attached to a preferred sleeve when the sleeve is attached to the bottle. The illustrated sectional view further depicts a first axis W and second axis L orthogonal to the first axis W, the bottle having a width along the first axis W and a length along the second axis L wherein the width W is greater than the length L. Gel pads 25 and 30 are sized to substantially span the width of the bottle along the first axis W.
Figure 30:
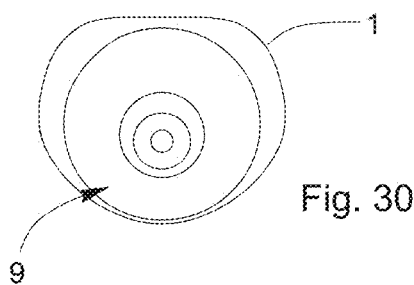
FIG. 30 is a top plan view of the bottle of FIG. 27, including a preferred cap 9 which is a different style cap from the cap shown in FIG. 1, and is illustrated to represent a push-pull style cap.
Figure 31:
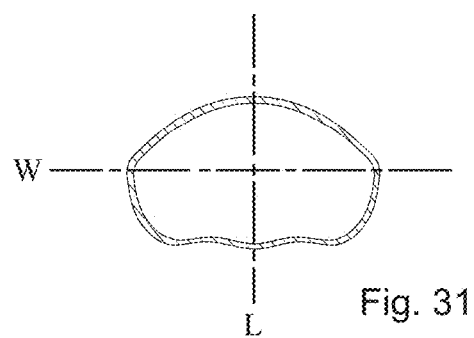
FIG. 31 is a sectional view through section E-E of FIG. 27.
Figure 32:
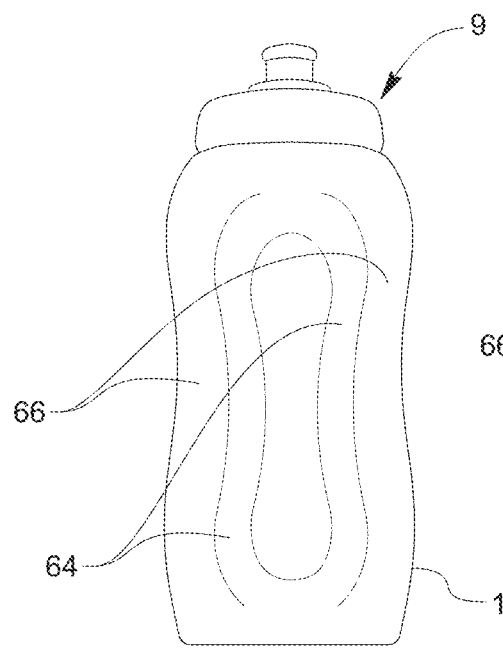
FIG. 32 is a back elevational view of the bottle of FIG. 27.
Figure 33:
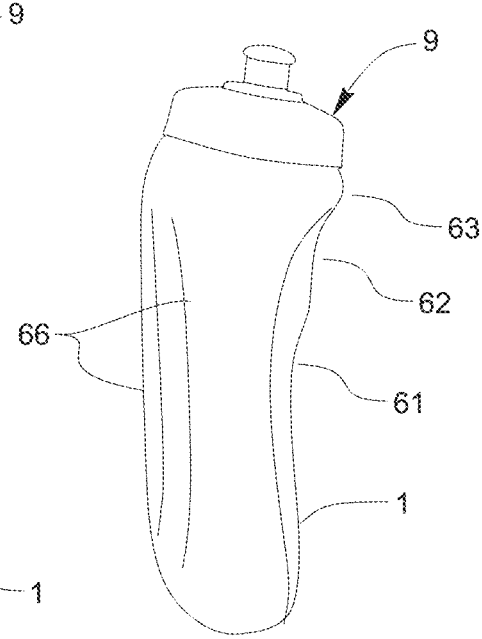
FIG. 33 is a left side perspective view of the bottle of FIG. 27.
Figure 34:
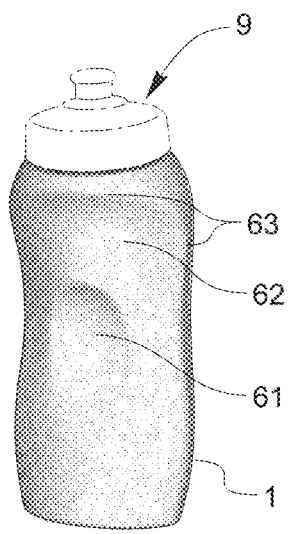
FIG. 34 is a front perspective view of the bottle of FIG. 27.
Figure 35:
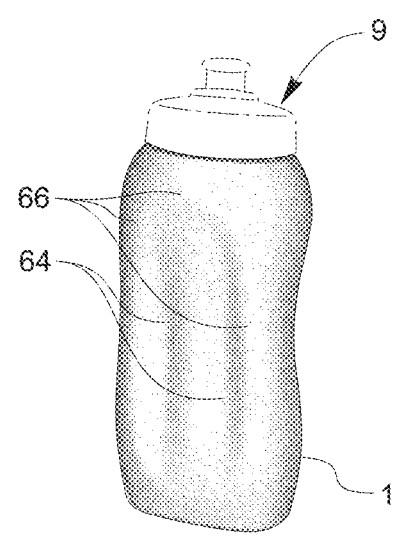
FIG. 35 is a back perspective view of the bottle of FIG. 27.

FIG. 31 shows cross-section of the preferred bottle taken along plane E-E indicated in FIG. 27, and defined by a first axis W and second axis L orthogonal to axis W, the bottle having a length along the first axis W and a width along the second axis L wherein the width W is greater than the length L. FIG. 26 illustrates the same sectional view through section plane E-E of FIG. 27 but with gel pads 25 and 30 shown in the positions as they would when installed in the sleeve with the sleeve surrounding the bottle. The sleeve itself is not illustrated in this case for ease and clarity of illustration. Axes W and axis L are labeled, as with FIG. 31. Cross-section plane E-E is defined by a first axis W and second axis L orthogonal to axis W, the bottle having a width along the first axis W and a length along the second axis L wherein the width W is greater than the length L. In other words, the preferred bottle as illustrated is not circular, but rather is closer to being oval or oblong in the shape of its perimeter along the section plane as illustrated. Gel pads 25 and 30 are sized to substantially span the width of the bottle along the wider of the two dimensions (as between L and W), which in the illustration corresponds to the face axis W. The preferred bottle 1 as can be seen in FIG. 31 is somewhat flattened in the side or depth axis L to allow more surface area of the bottle, and thus more fluid held in the bottle 1, to be exposed to gel pads 25 and 30, increasing the efficiency of transfer by contact. This flattened geometry also aids in making the bottle 1 easier to squeeze.

The gel pads 25 and 30 can be shaped differently than the preferred illustrated versions, but preferably still substantially span the front and rear surfaces of bottle 1 (in other words, if the oval perimeter of the preferred bottle can be generally characterized as having four sides, with two longer sides and two shorter sides, the front and rear sides are considered for this description as being the front and rear surfaces or sides). In addition, the front and rear surfaces of the bottle 1 are preferably somewhat flattened such that the gel pads in combination with preferred bottle geometry inhibit the sleeve 20 from twisting/shifting around the bottle 1. Twisting/shifting is further mitigated by disclosed features of bottle 1 such as recesses 64, lips 66 and further on the front side of bottle 1 the sides of lip 63 (as it continues down both sides of bottle 1) effectively creating two rails down the front left and right sides of bottle 1. Further, the gel pads in combination with disclosed bottle geometry inhibit the sleeve 20 from falling off the bottle 1 while in use.

When the sleeve (together or separated from the bottle) is kept in a freezer or cooled to a desired temperature, the sleeve 20 with gel pads 25 and 30 take on a more firm shape and are connected more firmly to bottle 1. As the sleeve 20 becomes less firm as its temperature increases to a certain level, the geometries described above still hold the sleeve 20 firmly coupled with bottle 1.

FIG. 3 shows the bottle/sleeve 10 in use, with the hand 19 of a user grasping it through the strap, and further with the gel pads installed in the sleeve as described above. When the user's hand is inserted between the upper strap 4 and the sleeve 20, the gel 36 from the first gel pad 30 can gently cool the palm of the user's hand, while the gel 26 from the second gel pad 25 is positioned in the area of the user's fingers. The void area 65 does not have gel, and is further positioned along a central recessed area of the bottle (see, e.g., FIG. 1), thereby providing a gel-free region which is also a natural grasping location for the user's fingertips. This provides both a sturdy area for grasping while also providing an easier squeeze area and a location where the user's fingers will not be subject to the cold temperatures of the gel pads.

As can be seen in FIG. 3, the upper strap 4 is folded on itself through adjuster 5 with the ends splayed and fastened to the top of sleeve 20 via stitches 15, 16 and perimeter stitch 47 wherein the splay of the upper strap 4 creates a V-shaped finger or thumb retainment area, allowing the user to hold bottle/sleeve 10 with the thumb outside a portion of the upper strap 4, and thus a portion of the palm not resting against the back side of the sleeve 20 overlying gel pad 30.

The disclosed geometry has a number of advantages, in that the sleeve with the second gel pad 30 acts as an insulator, insulating fluids held in the bottle from the heat flowing from the user's hand, allowing the user to hold the bottle/sleeve 10 with minimal hand contact if desired, or more contact if desired, thus allowing the user to regulate contact and thus the cooling influence of the bottle/sleeve 10. The placement and shape of the second gel pad 30 focuses the cooling effect of the gel pad 30 to the palm of a user's hand and can avoid the fingers. Further, the first gel pad 25 is shaped with a cutout or void area such that fingers have a less directed cooling effect.

Figure 38:
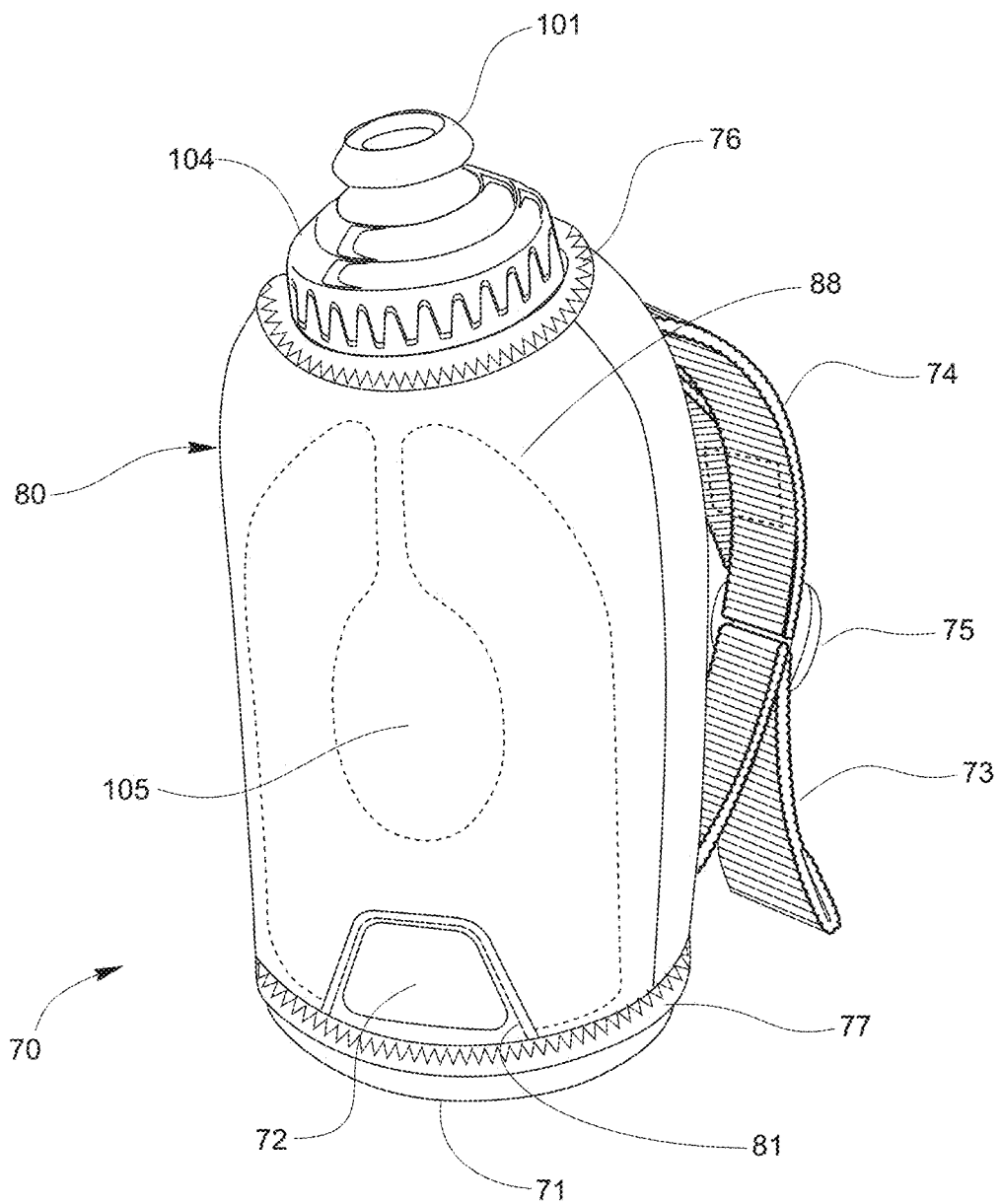
FIG. 38 is a front three-quarter perspective view of another embodiment of the invention.

FIG. 38 shows another embodiment of the preferred bottle/sleeve 70 in which a different shaped bottle 71 is coupled with sleeve 80. A finger squeeze area 105 indicates a void area without underlying gel, as with the embodiment described above. For the most part, steps for assembly of the sleeve 80 are the same as for sleeve 20, although the sleeve panel 85 (see FIGS. 39, 40) and front gel pad 110, and rear gel pad 120 are of slightly different shape, as a close fit between bottle 71 and sleeve 80 is desirable.

Figure 39:
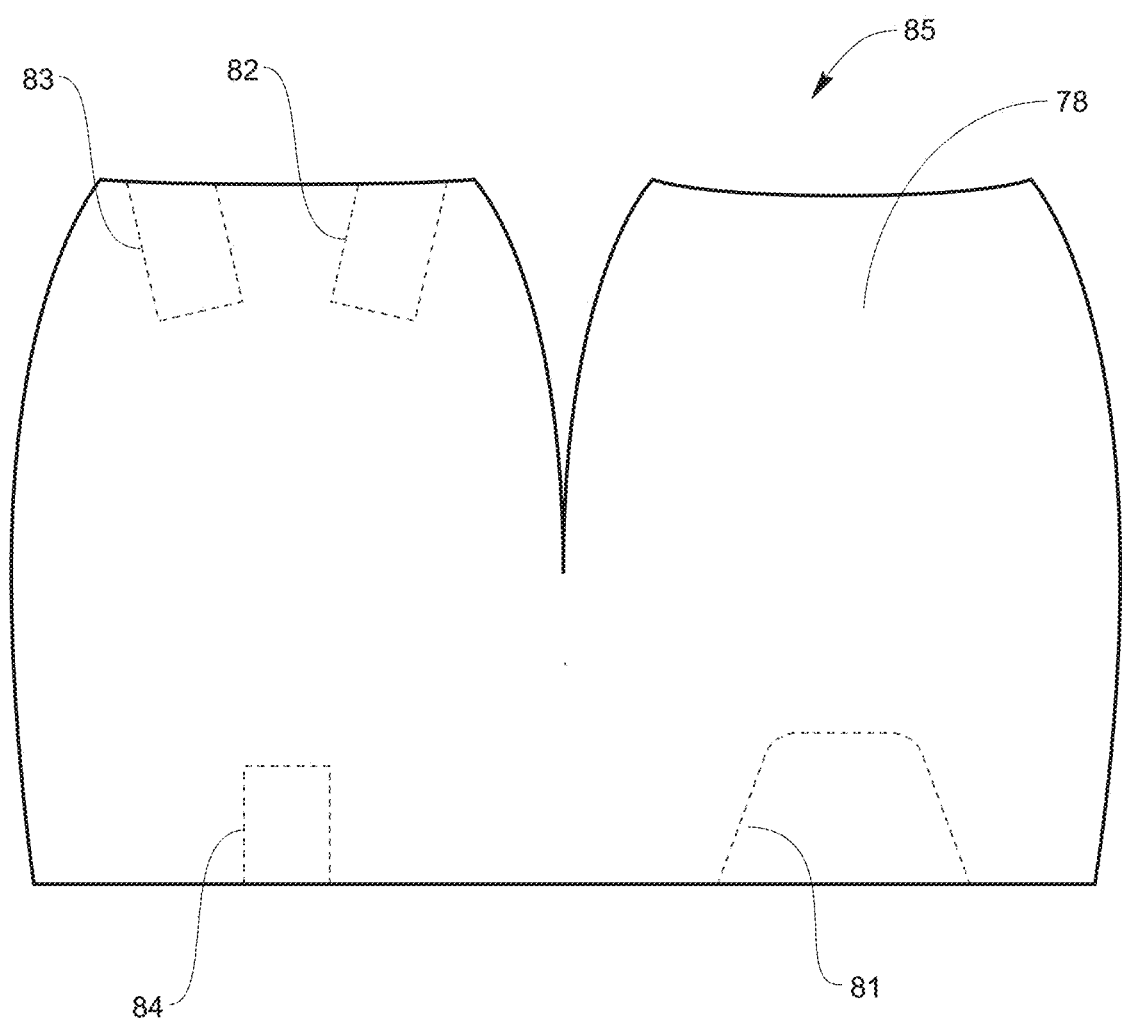
FIG. 39 is an inside back view of a preferred sleeve panel 85, showing stitching 81, 84, 82 and 83 can be seen.
Figure 40:
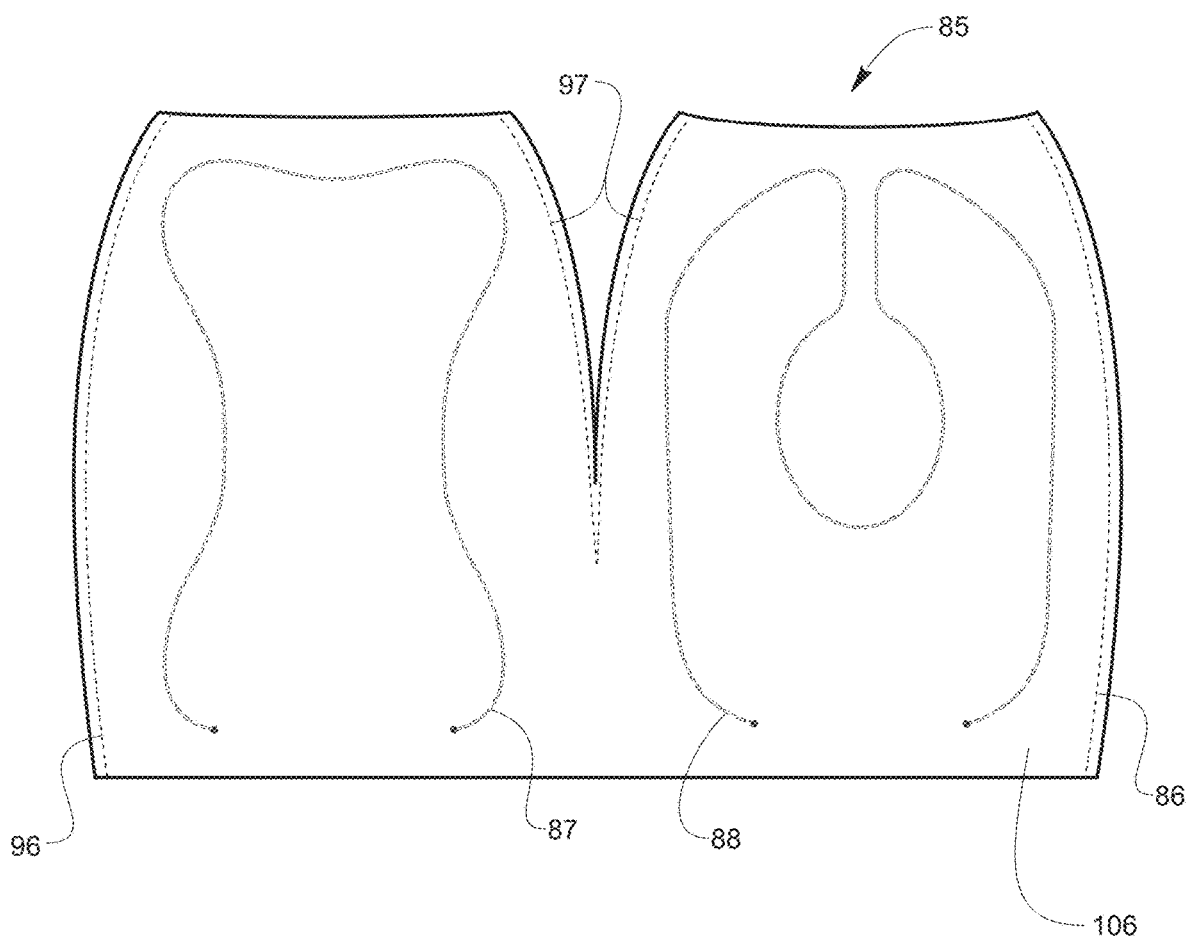
FIG. 40 is a back view of the sleeve panel 85 of FIG. 39, shown with a retainer panel 106 attached.
Figure 41:
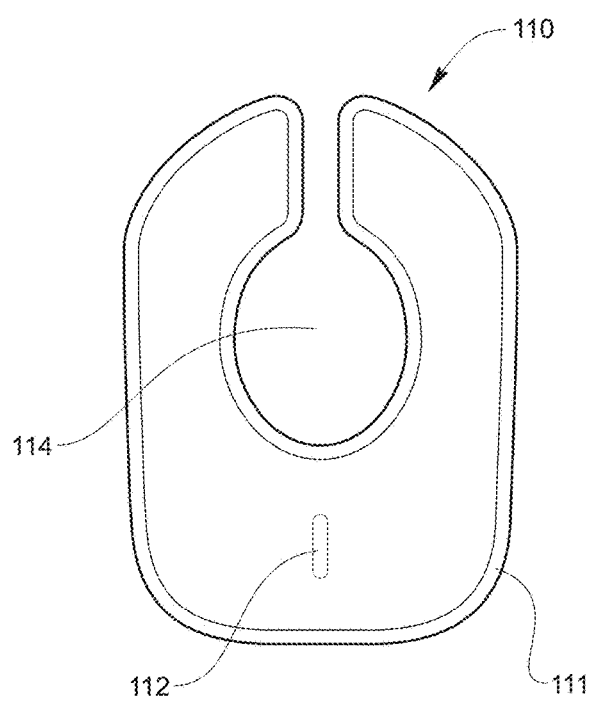
FIG. 41 is a front view of an encapsulated gel pad 110, the back view being a mirror image.
Figure 42:
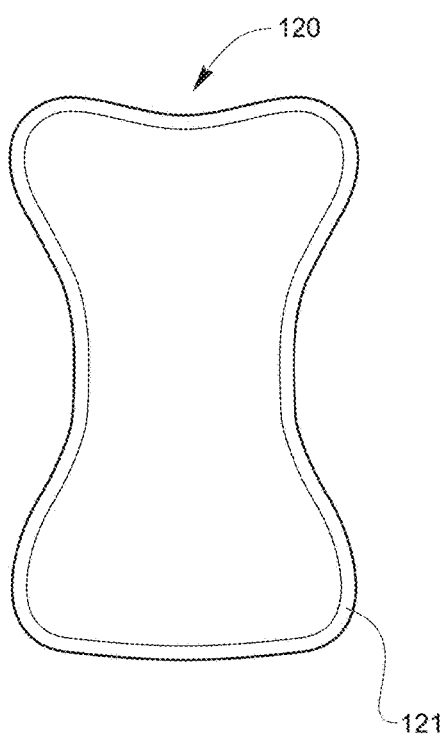
FIG. 42 is a front view of an encapsulated gel pad 120, the back view being a mirror image.
Figure 43:
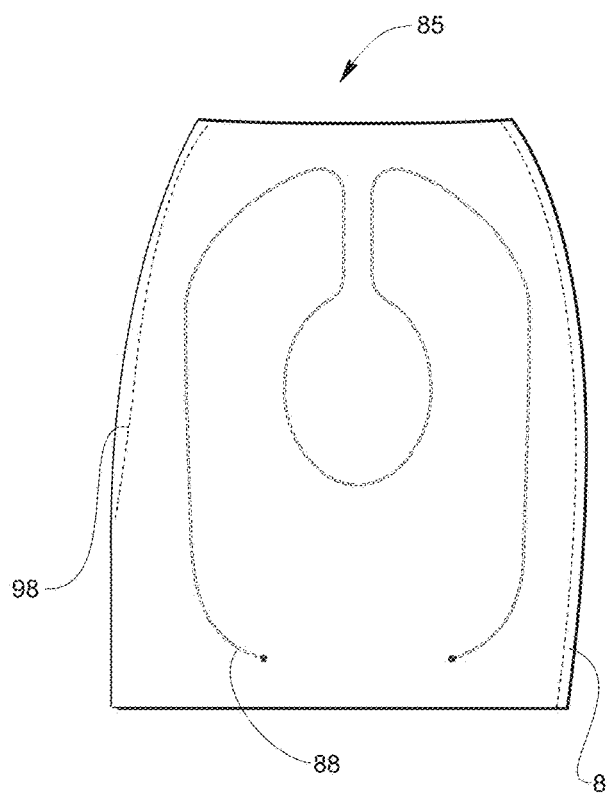
FIG. 43 shows a front view of the sleeve panel of FIG. 40, folded in half and sewn along seams 89 and 98.
Figure 44:
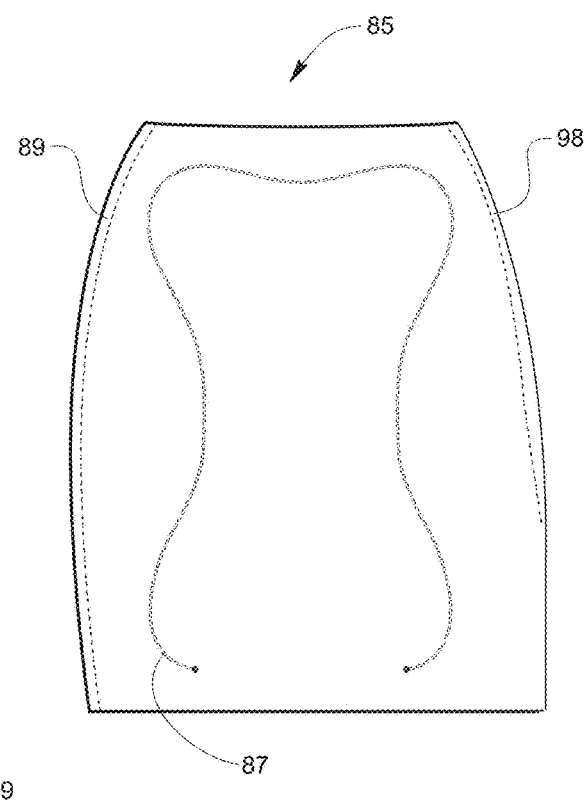
FIG. 44 shows a back view of the sleeve panel of FIG. 40, folded in half and sewn along seams 89 and 98.
Figure 47:
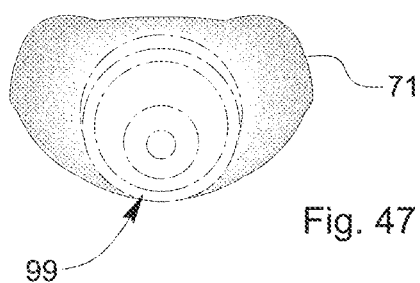
FIG. 47 is a top plan view of the bottle of FIG. 45.

As can be seen in FIG. 39, the sleeve is partially formed by a panel 85, which is similar to sleeve panel 40. A retainer panel 106 (see FIG. 40), preferably of a stretchy mesh material, is coupled with the faced neoprene/SBR base material forming the sleeve panel 85. Preferably, hand straps 73, 74 are sewn in place by stitches 82, 83 and 84, and perimeter stitches 86, 96, and 97 are added in a similar manner as described above for prior embodiments. Further, pocket forming stitches 87 and 88 are sewn through the retainer panel 106 and a tricot faced neoprene/SBR panel/strap/logo; the sleeve panel 85 is then folded in half and sewn to itself via stitches 89 and 98. Gel pads 110 and 120 are assembled in pockets created by stitches 88 and 87 respectively, wherein the top and bottom edges of the sleeve panel 85 are edge-bound with appropriate edge binding made of Lycra or other similar flexible/elastic type edge binding. Sleeve 80 can be then turned right-side-out, finished with upper and lower edging 76,77, and mounted to the bottle 71 to form the combined bottle/sleeve 70. The first gel pad 110 may include a void area 114 and a crease 112, and is joined at the perimeter 111 by a weld; the other gel pad 120 likewise is joined at the perimeter 121 by a weld.

FIGS. 45-52 show another preferred bottle 71 with cap 99 having a spout, which couples with sleeve 80. As seen in FIG. 38, the upper strap 74 along with other elements allows a user to affix the bottle/sleeve 70 to a user's hand. The bottle shape for bottle 71, including recess 92, lip 93, 102, recess 94, lip 91 and other elements couple with the gel pad 110 and/or gel pad 120 contained in the sleeve 80 such that the weight of carried fluids is firmly, comfortably and reliably held such that a user does not need to grasp the bottle/sleeve and ready access to fluids is provided. When sleeve 80 is installed on the bottle 71, the disclosed geometry as discussed above engage with disclosed features of bottle 71 in combination with resilience/elasticity of sleeve 80, retaining bottle 71 in sleeve 80 until a user so desires to remove bottle 71 for cleaning or the like, a user can easily disengage sleeve and remove bottle. Gel pads 110 and 120 couple with recessed areas of bottle 71, for example recess area 92 with lip area 93 and 102 couple with gel pad 110 and recess areas 94 with perimeter lip 91 couple with gel pad 120.

Figure 45:
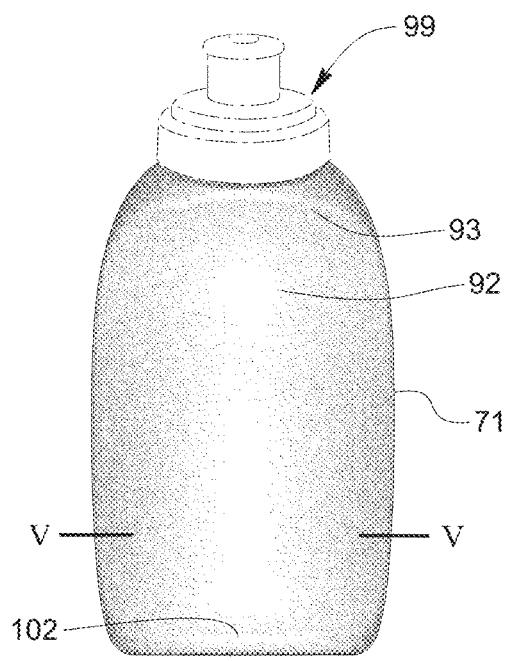
FIG. 45 is a front elevational view of a preferred bottle 71.
Figure 46:
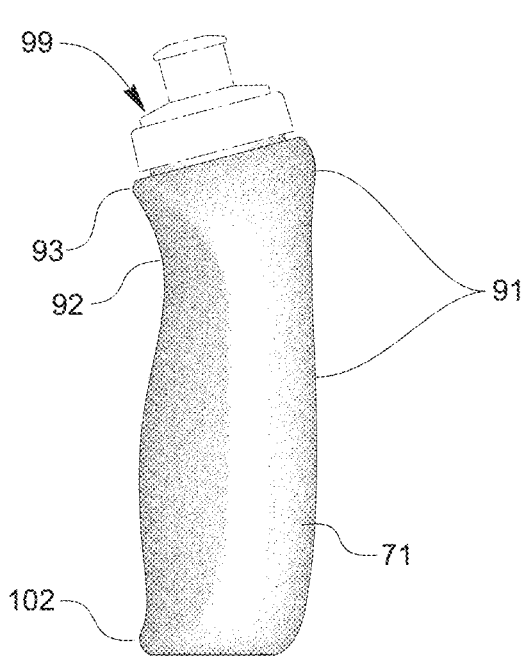
FIG. 46 is a right side elevational view of the bottle of FIG. 45, the left side being a mirror image.
Figure 48:
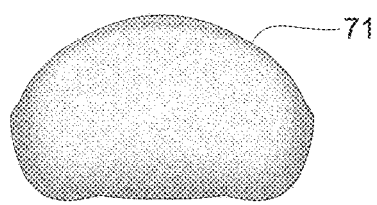
FIG. 48 is a bottom plan view of the bottle of FIG. 45.
Figure 49:
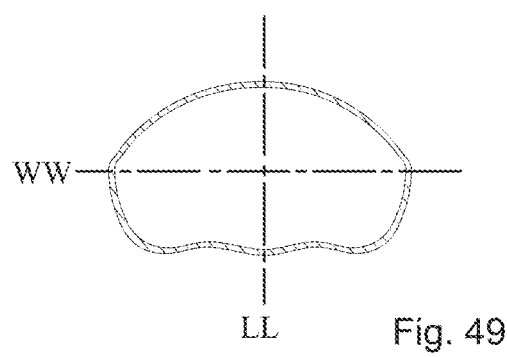
FIG. 49 is a sectional view through section V-V of FIG. 45.
Figure 50:
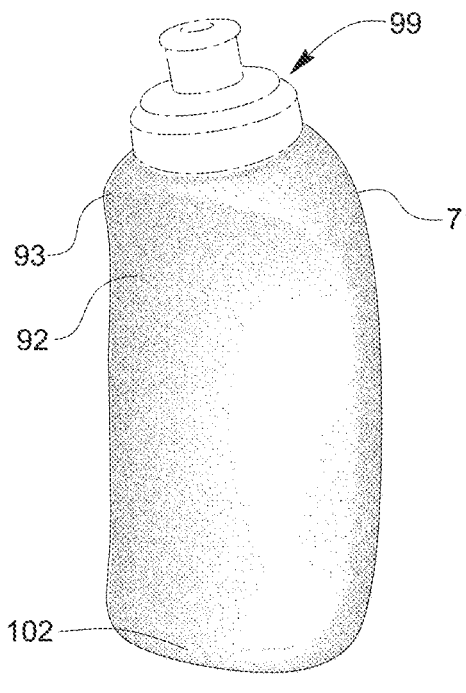
FIG. 50 is a front perspective view of the bottle of FIG. 45.
Figure 51:
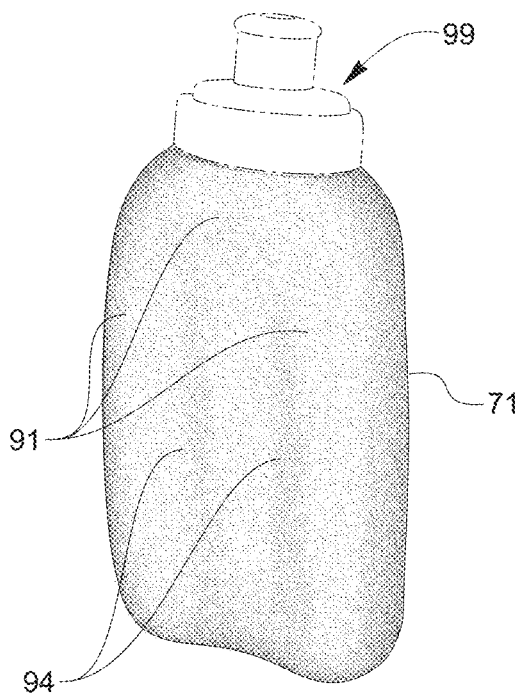
FIG. 51 is a back perspective view of the bottle of FIG. 45.
Figure 52:
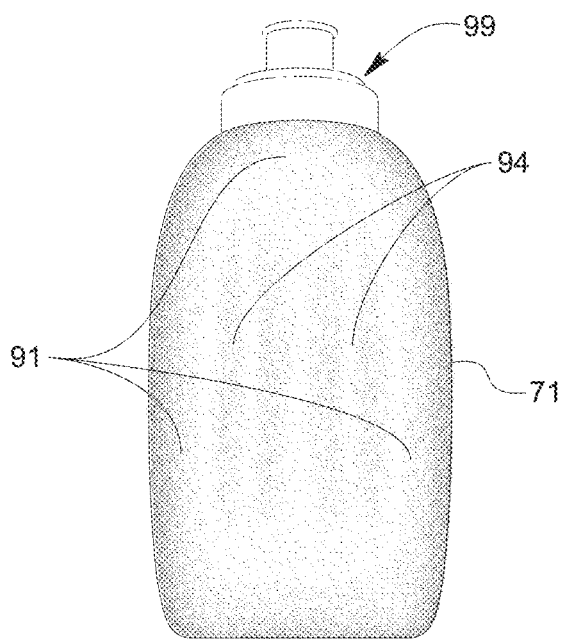
FIG. 52 is a back elevational view of the bottle of FIG. 45.

FIG. 49 shows cross-section taken along section plane V-V in FIG. 45, in which the circumference of the bottle is defined by a first axis WW and second axis LL orthogonal to axis WW, the bottle having a width along the first axis WW and a length along the second axis LL wherein the width of the bottle WW is greater than the length of the bottle LL. Thus, as described above, the preferred bottle includes a front and a rear which are each greater in length than the two sides adjoining the front and the rear. Gel pads 110 and 120, when installed in pockets formed by stitch 88 and 87 respectively, are sized to substantially span the width of the bottle at the front and the rear, along axis WW.

Figure 53:
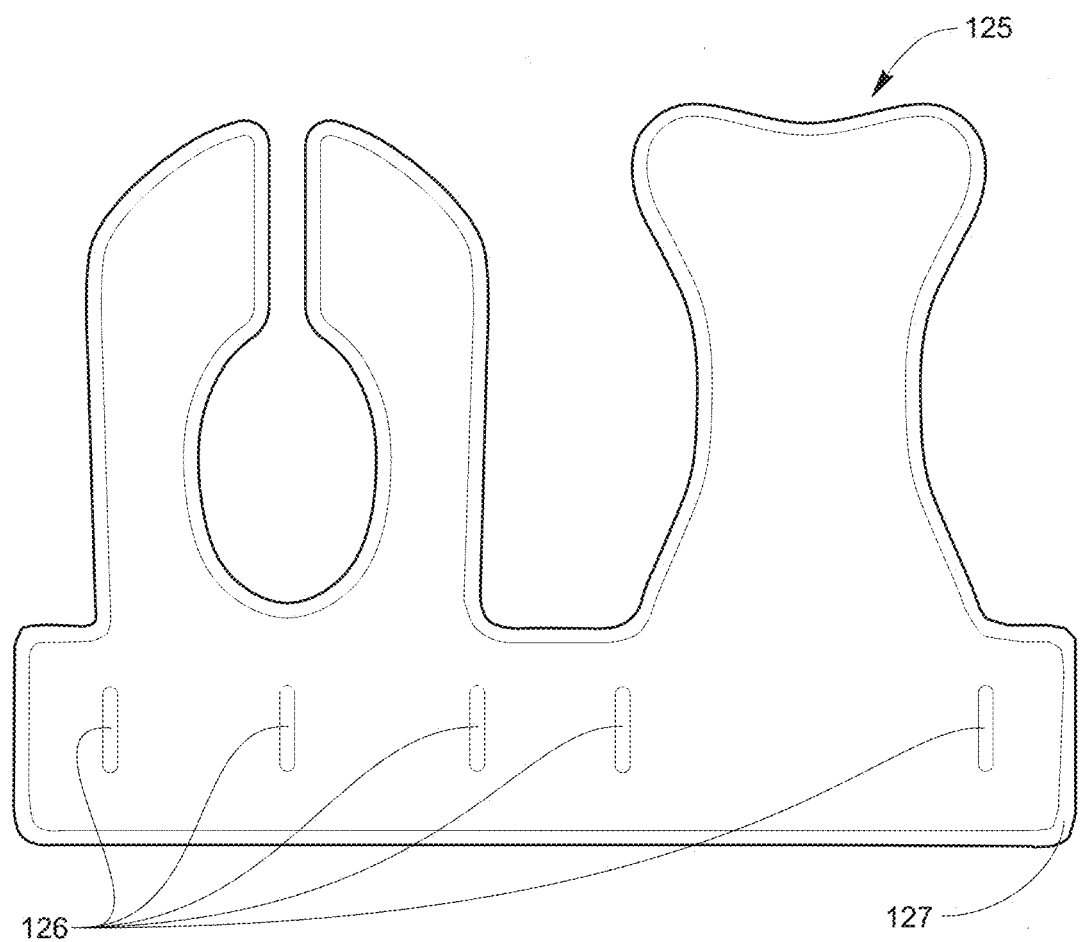
FIG. 53 is a front elevational view of an alternate encapsulated gel pad 125, the back view being a mirror image.

FIG. 53 is a front view of an alternative encapsulated gel pad embodiment 125, illustrating an example in which it may be desirable to manufacture the gel pad in one piece, bonded or welded at a perimeter 127. In this example, the bottom section or other areas are connected, and as shown it may be desirable to have the gel pad wrap fully around the bottom end of the bottle. In general a one-piece gel pad is less preferable as it tends to limit the stretch of the sleeve and can interfere with attachment of the sleeve to the bottle, although in some cases it could be desirable to provide extra cooling to the bottom area of the bottle. Further it may be desirable to have a portion of the gel pad (or a secondary pad) wrap around the base of the bottle such that it is in close contact with the entire base of the bottle, and most preferably the base portion is formed with several creases 126 to facilitate folding around the bottle. For gel pad 125, a retainment pocket in the sleeve could be formed as shaped such as to trap pad 125 in place in the sleeve as shown in other embodiments.

The sleeve as described above is preferably constructed by sewing a somewhat flat die-cut panel of neoprene/SBR, stretch mesh, webbing and other elements together while trapping gel pads 25 and 30. Alternatively, the sleeve can be constructed by knitting, gluing, integrally forming or otherwise fastening parts together that have been manufactured from a variety of processes and techniques. For example a gel pad could be ultrasonically welded together such that it is the sleeve and strap could be attached separately to the bottle neck and base. Further the gel pads could be held in place via heat shrink film positioned on the bottle as disclosed and a secondary strap is attached to the neck and base of the bottle. Some other optional fabrics for versions of the sleeve include: leather, felt, waterproof/water resistant fabric, breathable/punched fabric or others. Sleeve parts can be constructed in a number fabrics of different materials as desired. The sleeve portion of the invention could be constructed in a variety of different ways other than as described above. For example various parts could be combined, molded as one, woven, heat sealed together, ultrasonically bonded together or formed in other ways. The sleeve can be used with a variety of different bottles/vessels having shapes other than those described above and illustrated.

The hand strap for holding the bottle is preferable as disclosed above but in some cases it may be advantageous to simplify the hand strap by using a single strap of webbing or a simple strap of fabric in which the top strap could be sewn to the top of the sleeve without a splay one end on top of another. Or, the splay of the upper strap 4 could be adjusted wider to allow a wider area in the V-shaped finger or thumb retainment area.

In some cases it may be desirable to use chemically activated pads wherein a chemical reaction is initiated and the pads become hot or cold although generally the disclosed reusable/re-freezable gel pads are preferable.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. An insulator for use with a bottle, comprising:
   a sleeve defined by a sleeve panel forming a sidewall extending upwardly from a bottom end to a top end, the top end having an opening, wherein the bottle is retainable within an interior space defined by the sleeve panel;
   a first heat absorbing pad positioned on the sidewall of the sleeve; and
   a second heat absorbing pad positioned on the sidewall of the sleeve, the second heat absorbing pad being positioned at a location diametrically opposite the position of the first heat absorbing pad;
   the first heat absorbing pad further being formed with a central void, wherein the first heating absorbing pad sub tially encircles the central void.

2. The insulator of claim 1, wherein the sleeve panel further comprises an interior side facing toward the interior space and an exterior side facing away from the interior space, the first heat absorbing pad and the second heat absorbing pad each being positioned on the interior side of the sleeve panel.

3. The insulator of claim 2, further comprising a retainer panel attached to the sleeve panel, the first heat absorbing pad and the second heat absorbing pad each being positioned between the retainer panel and the sleeve panel.

4. The insulator of claim 3, wherein the retainer panel is relatively more heat-conductive than the sleeve panel.

5. The insulator of claim 4, wherein the first heat absorbing pad and the second heat absorbing pad are formed as a single combined heat absorbing pad, the single combined heat absorbing pad being configured with separate regions which define the first heat absorbing pad and the second heat absorbing pad.

6. The insulator of claim 1, wherein the second heat absorbing pad is configured with a narrow central neck, the narrow central neck being positioned centrally between the top end and the bottom end of the sleeve.

7. The insulator of claim 6, further comprising a height from the top end to the bottom end of the sleeve, with a midpoint defined half-way between the top end and the bottom end, and further wherein both the central void and the neck intersect with the midpoint.

8. The insulator of claim 1, further comprising a height from the top end to the bottom end of the sleeve, with a midpoint defined half-way between the top end and the bottom end, wherein the central void intersects with the midpoint.

9. The insulator of claim 2, further comprising a hand strap attached to the sleeve, the hand strap being positioned on the exterior side of the sleeve panel and over the second heat absorbing pad.

10. The insulator of claim 2, wherein the bottle includes a length and a width along a plane perpendicular to a height of the bottle, the width of the bottle being greater than the length of the bottle, and further wherein, when the bottle is retained within the sleeve, the first heat absorbing pad extends substantially across the entire width of the bottle and the second heat absorbing pad extends substantially across the entire width of the bottle.

11. The insulator of claim 2, further comprising a retainer panel attached to the sleeve panel, the retainer panel being arranged to define a first pocket and a second pocket on the interior side of the sleeve, the first heat absorbing pad being removably retained within the first pocket and the second heat absorbing pad being removably retained within the second pocket.

12. The insulator of claim 1, wherein each of the first heat absorbing pad and the second heat absorbing pad are filed with a gel material.

13. An insulator for use with a bottle, comprising:
    a sleeve defined by a sleeve panel forming a sidewall extending upwardly from a bottom end to a top end, the top end having an opening, wherein the bottle is retainable within an interior space defined by the sleeve panel;
    a hand strap attached to the sleeve between the top end and the bottom end, the hand strap forming an opening between the hand strap and the sleeve;
    a heat absorbing pad positioned on the sidewall of the sleeve, the heat absorbing pad including a hand heat absorbing pad region located at a position underlying the hand strap; and
    the sleeve further having a void region positioned on the sidewall of the sleeve, the void region being located diametrically opposite the hand heat absorbing pad region, wherein the heat absorbing pad is not positioned over the void region when the heat absorbing pad is positioned on the sidewall of the sleeve.

14. The insulator of claim 13, wherein the heat absorbing pad further comprises a finger heat absorbing pad region, the finger heat absorbing pad region substantially encircling the void region.

15. The insulator of claim 14, wherein the heat absorbing pad comprises a first heat absorbing pad and a second heat absorbing pad, the first heat absorbing pad encompassing the finger heat absorbing pad region and the void region, the second heat absorbing pad encompassing the hand heat absorbing pad region.

16. The insulator of claim 14, wherein the sleeve panel further comprises an interior side facing toward the interior space and an exterior side facing away from the interior space, the heat absorbing pad being positioned on the interior side of the sleeve panel.

17. The insulator of claim 16, further comprising a retainer panel attached to the sleeve panel, the heat absorbing pad being positioned between the retainer panel and the sleeve panel.

18. The insulator of claim 17, wherein the retainer panel is relatively more heat-conductive than the sleeve panel.

19. The insulator of claim 15, wherein the heat retaining pad is integrally formed with the sleeve panel.

20. The insulator of claim 14, wherein the hand heat absorbing pad region is configured with a narrow central neck, the narrow central neck being positioned centrally between the top end and the bottom end of the sleeve.

21. The insulator of claim 20, wherein the void region is positioned centrally between the top end and the bottom end of the sleeve.

22. The insulator of claim 20, further comprising a height from the top end to the bottom end of the sleeve, with a midpoint defined half-way between the top end and the bottom end, and further wherein both the void region and the central neck intersect with the midpoint.

23. The insulator of claim 13, wherein the bottle includes a length and a width along a plane perpendicular to a height of the bottle, the width of the bottle being greater than the length of the bottle, and further wherein, when the bottle is retained within the sleeve, hand heat absorbing pad region extends substantially across the entire width of the bottle and the finger heat absorbing pad region extends substantially across the entire width of the bottle.

24. The insulator of claim 13, further comprising a retainer panel attached to the sleeve panel, the retainer panel being arranged to define a pocket on the interior side of the sleeve, the heat absorbing pad being removably retained within the pocket.

25. The insulator of claim 13, wherein each of the first heat absorbing pad and the second heat absorbing pad are filed with a gel material.

\* \* \* \* \*